US 7,861,161 B1

(12) United States Patent
Bedell et al.

(10) Patent No.: US 7,861,161 B1
(45) Date of Patent: *Dec. 28, 2010

(54) REPORT SYSTEM AND METHOD USING PROMPT OBJECTS

(75) Inventors: Jeffrey A. Bedell, Arlington, VA (US); Eduardo Carranza, Fairfax, VA (US); L. Douglas Everhart, Arlington, VA (US); William Hurwood, Washington, DC (US); Benjamin Z. Li, Great Falls, VA (US); Ramkumar Ramachandran, Reston, VA (US); David B. Sherwood, McLean, VA (US); Stephen S. Trundle, Falls Church, VA (US); Abhimanyu Warikoo, New York, NY (US)

(73) Assignee: Microstrategy, Inc., McLean, VA (US)

( * ) Notice: Subject to any disclaimer, the term of this patent is extended or adjusted under 35 U.S.C. 154(b) by 1766 days.

This patent is subject to a terminal disclaimer.

(21) Appl. No.: 09/883,502

(22) Filed: Jun. 19, 2001

(51) Int. Cl.
*G06F 17/00* (2006.01)

(52) U.S. Cl. ..................................... 715/255

(58) Field of Classification Search ................. 715/530, 715/500, 531, 808, 809, 200, 255, 800; 707/4; 345/808, 809
See application file for complete search history.

(56) References Cited

U.S. PATENT DOCUMENTS

| 4,688,195 | A |   | 8/1987  | Thompson |   |
|-----------|---|---|---------|----------|---|
| 4,829,423 | A |   | 5/1989  | Tennant  |   |
| 5,197,005 | A |   | 3/1993  | Shwartz  |   |
| 5,276,870 | A |   | 1/1994  | Shan     |   |
| 5,313,394 | A |   | 5/1994  | Clapp    |   |
| 5,418,943 | A |   | 5/1995  | Borgida  |   |
| 5,421,008 | A |   | 5/1995  | Banning  |   |
| 5,555,403 | A |   | 9/1996  | Cambot   |   |
| 5,584,024 | A |   | 12/1996 | Shwartz  |   |
| 5,602,982 | A | * | 2/1997  | Judd et al. ................... 715/709 |
| 5,664,182 | A |   | 9/1997  | Nirenberg |  |
| 5,692,181 | A |   | 11/1997 | Anand    |   |
| 5,832,504 | A |   | 11/1998 | Tripathi et al. |
| 5,864,856 | A |   | 1/1999  | Young    |   |
| 5,914,878 | A |   | 6/1999  | Yamamoto |   |
| 5,945,990 | A | * | 8/1999  | Morrison et al. ............ 345/748 |
| 5,963,939 | A |   | 10/1999 | McCann et al. |
| 6,028,601 | A | * | 2/2000  | Machiraju et al. ........... 715/705 |
| 6,041,303 | A | * | 3/2000  | Mathews ....................... 705/1 |

(Continued)

OTHER PUBLICATIONS

Steinnacher, Monarch / ES Web-enables reports, InfoWorld, Mar. 6, 2000, vol. 22, p. 57.*

(Continued)

*Primary Examiner*—Cong-Lac Huynh
(74) *Attorney, Agent, or Firm*—Hunton & Williams, LLP

(57) ABSTRACT

An report system that incorporates prompt objects in a report definition to enable a user to specify answers to questions to customize a reporting system (e.g., decision support system, business intelligence and OLAP) report at execution time. A prompt object contains a single question to be answered, validation values for the answer, and attributes indicating how the prompt object is to be processed. A report is thus defined by selecting prompt objects in place of templates, filters, or any of the aspects of a template or filter. As a separate object, a single prompt may be issued once and the answer supplied to each reference to the prompt object in a report.

28 Claims, 18 Drawing Sheets

U.S. PATENT DOCUMENTS

| | | | |
|---|---|---|---|
| 6,154,766 | A | 11/2000 | Yost |
| 6,226,631 | B1 | 5/2001 | Evans |
| 6,247,008 | B1 | 6/2001 | Cambot |
| 6,260,050 | B1* | 7/2001 | Yost et al. ............... 715/501.1 |
| 6,279,033 | B1* | 8/2001 | Selvarajan et al. .......... 709/217 |
| 6,292,801 | B1 | 9/2001 | Campbell et al. |
| 6,292,811 | B1* | 9/2001 | Clancey et al. ............. 715/503 |
| 6,338,034 | B1 | 1/2002 | Ishikawa et al. |
| 6,377,993 | B1* | 4/2002 | Brandt et al. ............... 709/227 |
| 6,442,714 | B1* | 8/2002 | Griffin et al. .................. 714/46 |
| 6,533,822 | B2 | 3/2003 | Kupiec |
| 6,569,205 | B1 | 5/2003 | Poggi |
| 6,571,236 | B1 | 5/2003 | Ruppelt |
| 6,591,289 | B1* | 7/2003 | Britton ....................... 709/203 |
| 6,601,057 | B1 | 7/2003 | Underwood et al. |
| 6,658,093 | B1 | 12/2003 | Langseth et al. |
| 6,665,666 | B1 | 12/2003 | Brown et al. |
| 6,668,253 | B1* | 12/2003 | Thompson et al. ............ 707/10 |
| 6,684,188 | B1 | 1/2004 | Mitchell et al. |
| 6,697,825 | B1 | 2/2004 | Underwood et al. |
| 6,754,885 | B1* | 6/2004 | Dardinski et al. ........... 717/113 |
| 6,765,997 | B1* | 7/2004 | Zirngibl et al. .......... 379/88.18 |
| 6,768,788 | B1 | 7/2004 | Langseth et al. |
| 6,782,495 | B2* | 8/2004 | Bernklau-Halvor .......... 714/44 |
| 6,820,075 | B2* | 11/2004 | Shanahan et al. .............. 707/3 |
| 6,873,992 | B1* | 3/2005 | Thomas ...................... 707/102 |
| 6,925,443 | B1* | 8/2005 | Baggett et al. ................ 705/10 |
| 6,968,316 | B1* | 11/2005 | Hamilton ................. 705/36 R |
| 7,031,981 | B1* | 4/2006 | DeLuca et al. ........... 707/104.1 |
| 7,225,249 | B1* | 5/2007 | Barry et al. ................. 709/227 |
| 7,249,072 | B1* | 7/2007 | Nearhood et al. ............. 705/31 |
| 7,266,764 | B1* | 9/2007 | Flam .......................... 715/209 |
| 7,350,191 | B1* | 3/2008 | Kompella et al. ........... 717/108 |
| 7,356,478 | B1* | 4/2008 | Kohli ............................. 705/2 |
| 7,441,197 | B2* | 10/2008 | Tschiegg et al. ............ 715/741 |
| 7,725,811 | B1* | 5/2010 | Bedell et al. ................ 715/200 |
| 2001/0032215 | A1 | 10/2001 | Kyle et al. |
| 2001/0037224 | A1* | 11/2001 | Eldridge et al. ................ 705/4 |
| 2001/0044813 | A1* | 11/2001 | Frank ......................... 707/530 |
| 2001/0047274 | A1* | 11/2001 | Borton ........................... 705/1 |
| 2002/0063717 | A1* | 5/2002 | Minner et al. ............... 345/557 |
| 2002/0069119 | A1* | 6/2002 | Rogatinsky .................. 705/26 |
| 2002/0069207 | A1* | 6/2002 | Alexander et al. .......... 707/102 |
| 2002/0069230 | A1 | 6/2002 | Schubert et al. |
| 2002/0095311 | A1* | 7/2002 | Donahue ....................... 705/1 |
| 2002/0133502 | A1* | 9/2002 | Rosenthal et al. ........ 707/104.1 |
| 2002/0138527 | A1 | 9/2002 | Bell et al. |
| 2002/0184264 | A1 | 12/2002 | Berg et al. |
| 2002/0184265 | A1* | 12/2002 | Gupta ......................... 707/513 |
| 2002/0188633 | A1 | 12/2002 | Davis et al. |
| 2003/0009367 | A1* | 1/2003 | Morrison ....................... 705/9 |
| 2003/0023639 | A1 | 1/2003 | Chen |
| 2003/0061201 | A1* | 3/2003 | Grefenstette et al. ........... 707/3 |
| 2003/0079185 | A1 | 4/2003 | Katariya et al. |
| 2003/0158749 | A1* | 8/2003 | Olchanski et al. ............. 705/2 |
| 2003/0210264 | A1* | 11/2003 | Macrossan .................. 345/751 |
| 2004/0015837 | A1* | 1/2004 | Worthington et al. ....... 717/107 |
| 2004/0083422 | A1* | 4/2004 | Duan et al. ................. 715/500 |
| 2004/0088318 | A1* | 5/2004 | Brady ......................... 707/102 |
| 2004/0093378 | A1* | 5/2004 | Warnock .................... 709/203 |
| 2004/0181756 | A1 | 9/2004 | Berringer et al. |
| 2004/0205643 | A1 | 10/2004 | Harrington |
| 2006/0026122 | A1* | 2/2006 | Hurwood et al. ............... 707/1 |
| 2007/0041545 | A1* | 2/2007 | Gainsboro .................. 379/188 |

OTHER PUBLICATIONS

Jancsek, Using Technology to modernize loan review at BankAmerica Corporation, Commercial Lending Review, Spring 1997 vol. 12, p. 13, 5pgs.*

Srihari et al., Information Extraction Supported Question Answering, Google Oct. 1999, pp. 1-12.*

Zhang et al., Web based Pattern Mining and Matching Approach to Question Answering, Google 2003, pp. 1-8.*

Sneiders, Automated Question Answering Using Question Templates that Cover the Conceptual Model of the Database, Google 2002, pp. 235-239.*

Robert C. Stern, Bruce M. Anderson and Craig W. Thompson, A Menu-Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces To Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

Business Objects User's Guide Version 5.1, 2000.
Getting Started with Business Objects Version 5.1, 2000.
Business Objects Deployment Guide, 2000.
Business Objects Designer's Guide Version 5.1, 2000.
Business Objects Error Message Guide Version 5.1, 2000.
Business Objects Generic ODBC Access Guide Version 5.1, 2000.
Business Objects Info View User's Guide, 2000.
Business Objects Installation and Upgrade Guide, 2000.
Business Objects MS Access Database Guide Version 5.1, 2000.
Business Objects MS SQL Server Database Guide Version 5.1, 2000.
Business Objections Supervisor's Guide Version 5.1, 2000.
GIS/LIS'88 Proceedings accessing the world, vol. 2 pp. 741-750.
Quick Start MicroStrategy Agent Version 6.0, 1999.
User Guide MicroStrategy Agent Version 6.0, 1999.
User Guide MicroStrategy Architect Version 6.0, 1999.
User Guide MicroStrategy Objects Version 6.0, 1999.
Excel Add-In MicroStrategy Objects Version 6.0, 1999.
User Guide MicroStrategy Intelligence Server Version 6.0, 1999.
User Guide MicroStrategy Administrator Version 6.0, 1999.
Administrator Guide MicroStrategy Administrator Version 6.5, 2000.

Blum, Diamond, Hammon, Perkins, and Semmel, "An Intelligent Navigational Assistant for a Decision Resource Database," Proceedings of the Third Annual Expert Systems in Government Conference, pp. 19-25 (1987).

Blum, Semmel & Sigillito, "Navigating through Complex Databases: A Case Study," Application of Artificial Intelligence to Command & Control Systems, pp. 380-396 (1988).

1990 Brio DataPrism Reference Manual, Version 1.0 for Apple Macintosh Computers.
1991 Brio DataPrism Reference Manual Update, Version 1.1 for Apple Macintosh Computers.
1990 Brio DataPrism User's Guide, Version 1.1 Update for Apple Macintosh Computers.
1991 Brio DataPrism Update, Version 1.7 for Apple Macintosh Computers.

1987 Metaphor Query Tutorial.
1988 Workstation Tools Training, Metaphor.
1989 Metaphor Database Administration, Release 9.0.
1989 Metaphor Database Administration DBA Tool.
1990 Metaphor Query Tutorial.
SkipperSQL 2.06 User's Manual.
Bipin C. Desai et al., "A portable natural language interface," AFIPS Conference Proceedings, vol. 56, 1987, National Computer Conference, pp. 53-58.
Arthur J. Benjamin et al., "A visual Tool for Managing Relational Databases," IEEE Int. Conference on Data Engineering, 1986, pp. 661-668.
X. Wu et al., "KDA: A Knowledge-based Database Assistant," Proceedings Fifth International Conference on Data Engineering, 1989, pp. 402-409.

I. Androutsopoulos et al., "Natural Language Interfaces to Databases—An Introduction," arXiv:cmp-Ig/9503013, vol. 2, Mar. 16, 1995, pp. 1-50.
S. L. Booth et al., "A Robust Natural Language Interface to a Decision Support System," Conference on Software Tools, 1985, pp. 229-236.
Ann Copestake et al., The Knowledge Engineering review, vol. 5, No. 4, Dec. 1990, "Natural language interfaces to databases," pp. 225-249.
Business Objects Deployment Guide, 1. Broadcast Agent 5.1, 2. Business Objects 5.1, 3. Web Intelligence 2.6, Business Objects Copyright 2000, Edition 2, pp. 1-360.

* cited by examiner

| PROMPT OBJECT | FROM PROMPT INSTANCE | FROM RESOLUTION OBJECT |
|---|---|---|
| TYPE<br>DEFAULT<br>PROPERTIES<br>VALIDATION PROPERTIES<br>PROMPT PROPERTIES<br>IMPORTS PROPERTIES<br>IMPORTABLE<br>TITLE, MEANING<br>REUSE | MERGE<br>INDEX<br>ExportToPrompt<br>IMPORTS<br><br>OVERRIDES THESE PROPERTIES<br><br>TITLE, MEANING, REUSE<br>DEFAULT | ANSWER<br>PREVIOUS, HASPREVIOUS<br>LOCATIONS<br>CLOSED<br>USED<br>INCOMPLETE, LOCKED<br><br>OVERRIDES THESE PROPERTIES<br><br>VALIDATION PROPERTIES |

FIG. 7

METRIC "SimpleInterest2"
    PROMPTS
1   ( YEAR "THE YEAR AT WHICH WE STOP CALCULATING INTEREST" )   IMPORTABLE
2   ( YEAR "THE YEAR FROM WHICH WE START CALCULATING INTEREST" )
    EXPRESSION
( [ INSTANCE(1) ] – [ INSTANCE(2) ] ) * 1.05 * ( AggMetric "LOAN" )

FIG. 11A

RESOLUTION

1 YEAR "MAIN YEAR AT WHICH WE STOP CALCULATING INTEREST"
LOCATIONS: INSTANCE (1) IN T2, INSTANCE (1) IN SimpleInterest2

2 YEAR "AUXILIARY YEAR AT WHICH WE STOP CALCULATING INTEREST"
LOCATIONS: INSTANCE (2) IN T2, INSTANCE (1) IN SimpleInterest2

2 YEAR "THE YEAR FROM WHICH WE START CALCULATING INTEREST"
LOCATIONS: INSTANCE (2) IN SimpleInterest2

FIG. 11B

| USER ACTION ON DRAFT PROMPT | EFFECT OF ACTION ON BLANK PROMPTS 1204 | SITUATIONS IN WHICH AN ERROR IS RETURNED |
|---|---|---|
| 1202 CANCELS | ALL BLANK PROMPTS ARE CANCELED, EVEN IF THEY WERE ALREADY CLOSED, AND EVEN IF THEIR REUSE PROPERTY SAYS THAT THEY CANNOT BE CANCELED. | ACTION FAILS ONLY IF THE DRAFT PROMPT CANNOT BE CANCELED. 1210 1206 |
| 1208 SETS TO DEFAULT | EACH OPEN BLANK PROMPT IS CLOSED TO ITS DEFAULT VALUE, OR CANCELED IF IT HAS NONE. | ACTION FAILS IF THERE IS A BLANK PROMPT THAT HAS NO DEFAULT VALUE, AND WHICH CANNOT BE CANCELED. 1212 |
| 1214 SETS TO PREVIOUS | EACH OPEN BLANK PROMPT IS CLOSED TO ITS PREVIOUS VALUE. IF IT HAS NO PREVIOUS VALUE THEN IT IS DECLINED. | ACTION FAILS IF A BLANK PROMPT'S REUSE PROPERTY SAYS THAT THE BLANK PROMPT CANNOT BE DECLINED. 1218 |
| 1220 DECLINES TO ANSWER | DETERMINES AN ACTION 1222 (PREVIOUS / DEFAULT / CANCEL / BREAK) FOR THE DRAFT PROMPT. THEN APPLIES THE ACTION AS DESCRIBED ABOVE. | ACTION FAILS IF EITHER THE DRAFT PROMPT'S REUSE PROPERTY SAYS IT CANNOT BE DECLINED, OR IF ONE OF THE BLANK PROMPTS CANNOT BE ANSWERED IN THE PRESCRIBED MANNER. 1224 |

| NAME | ANSWER | MINIMUM | MAXIMUM | ORIGIN | RESTRICTION |
|---|---|---|---|---|---|
| DSSPromptBoolean | TRUE OR FALSE | EMPTY | EMPTY | EMPTY | EMPTY |
| DSSPromptLong | LONG | LONG | LONG | EMPTY | EMPTY |
| DSSPromptString | STRING | LONG | LONG | EMPTY | EMPTY |
| DSSPromptDouble | DOUBLE | DOUBLE | DOUBLE | EMPTY | EMPTY |
| DSSPromptDate | | | | | |
| DSSPromptObjects | OBJECT INFO OR FOLDER | LONG | LONG | EMPTY | SEARCH |
| DSSPromptElements | ELEMENTS OR ELEMENT | LONG | LONG | DIMENSION OR ATTRIBUTE | ATTRIBUTE OR FILTER |
| DSSPromptExpression | EXPRESSION | LONG | LONG | EMPTY | EXPRESSION TYPE |
| DSSPromptExpressionDraft | EXPRESSION | EMPTY | EMPTY | EXPRESSION | EMPTY |

FIG. 14

REPORT SYSTEM AND METHOD USING PROMPT OBJECTS

FIELD OF THE INVENTION

This invention relates to a system that enables creation of reporting system, decision support system, business intelligence and on-line analytical processing reports that use prompt objects to define any aspect of the report, with the prompt objects being resolved at run-time of the report.

BACKGROUND OF THE INVENTION

Reporting system and decision support system have been developed to efficiently retrieve selected information from data warehouses. One type of decision support system is known as an on-line analytical processing system ("OLAP"). In general, OLAP systems analyze the data from a number of different perspectives and support complex analyses against large input data sets. OLAP systems generate output upon execution of a report that includes a template to indicate the way to present the output and a filter to specify the conditions of data on which the report is to be processed.

Reports may be extremely complicated and require many seconds, minutes, and sometimes even hours to process. Designing such complex reports is labor intensive. Further, in current systems, once a report is designed, if a user desires to change the template, filter, or any other sub-object or component, a completely new report must be created through the same laborious tasks. Although some report writing wizards have been developed in this field, those wizards also must be programmed and often only provide specific options from which a report designer may choose. Accordingly, the report writing wizards are often not useful to the report designer that generates a complex report. The inflexibility of current report creation systems is a drawback of current OLAP. Other drawbacks with current systems exist as well.

SUMMARY OF THE INVENTION

Accordingly, the present invention provides prompt objects that may be used to define some or every aspect of a report. A prompt object in object-oriented programming terms is a separate object from any report in which it is contained. In one embodiment, a prompt object contains a single question to be answered, validation values for the answer, and attributes indicating how the prompt object is to be processed. In addition, default values may be provided for the prompt object.

A report can thus be defined by selecting prompt objects in place of portions of static report definition including, but not limited to, templates, filters, or any of the aspects of a template or filter. Report definition involves specification of the elements to generate an output. For example, if a template is defined by a prompt object, then when a report is executed, the report prompts the user to select a template. The selected template is then validated based on the prompt object validation values and then processed.

By using prompts that are resolved at run-time, a complex report may be created that enables a wide variety of variation, depending on user preferences. A relatively untrained person may then execute the report, respond to the prompts and get a customized report. Additionally, in OLAP systems, a metadata database is often used to assist in accessing data from the data warehouse. The metadata may include report definitions, which limits the users who may create their own reports. By defining a report using prompts, users effectively create their own report based on the answers they provide to the prompts.

In addition, by creating each prompt as a separate prompt object, a number of advantages are realized. A single prompt may be shared by many other objects that are part of a report. That single prompt may then be asked of the user only once, resolved and then the answer may be provided for each place in which the prompt object is referenced. Also, as a prompt object, the validation values may be stored in the prompt object so that each time a particular prompt is used, the validation values are used to ensure that the answer is valid. Answers given to a prompt object may be stored in association with the prompt object so that in future executions of a report or execution of other reports that reference the same prompt object, that answer may be provided as a default value with or without prompting the user.

Further, by using prompt objects, other functions such as prompt in prompt and prompt object abstraction for report delivery may be provided as described in detail below.

Additionally, unlike report wizards where the programmer of the report wizard hard-codes the available options to present to the user, by defining a report using prompt objects, a report designer may create a customized report wizard by selecting the prompt objects to include in the report. The benefit is illustrated by an example. A report wizard has a fixed number of questions and answers to be provided before it creates a report. By using prompt objects, the report creator determines the number of questions. Instead of requiring the user to input fifteen answers, therefore, the user may only be required to provide two. Also, the questions to be asked of the user may be changed by selecting different prompt objects, rather than having to rewrite the wizard code.

Other objects and advantages of the invention will be apparent to one of ordinary skill in the art upon reviewing the detailed description of the invention.

BRIEF DESCRIPTION OF THE DRAWINGS

FIG. 7 depicts a diagram illustrating the relationship between prompt object, prompt instance and resolution object properties according to an embodiment of the present invention.

FIGS. 11a and 11b depict output of metrics of a template according to an embodiment of the present invention.

FIG. 12 depicts a table illustrating actions on draft prompts according to an embodiment of the present invention.

FIG. 14 depicts a table illustrating properties of various types of prompts according to an embodiment of the present invention.

DETAILED DESCRIPTION OF THE INVENTION

The present invention provides prompt objects for use in resolving reports in a reporting system, decision support system, business intelligence or OLAP system. An embodiment of an architecture for processing reports in which this invention may be used is provided in FIGS. 1 and 2 which are described below.

Throughout the specification, an embodiment of prompt objects used to prompt a user connected to a reporting system using a client-server architecture is provided. It should be appreciated that the present invention is also applicable to a system in which a user connects to a reporting system server through a web interface, telephone interface, report requesting system with reports automatically delivered to the user or some other interface. MicroStrategy's Narrowcaster, Telecaster, and Web systems may be used, for example.

Figure 1:
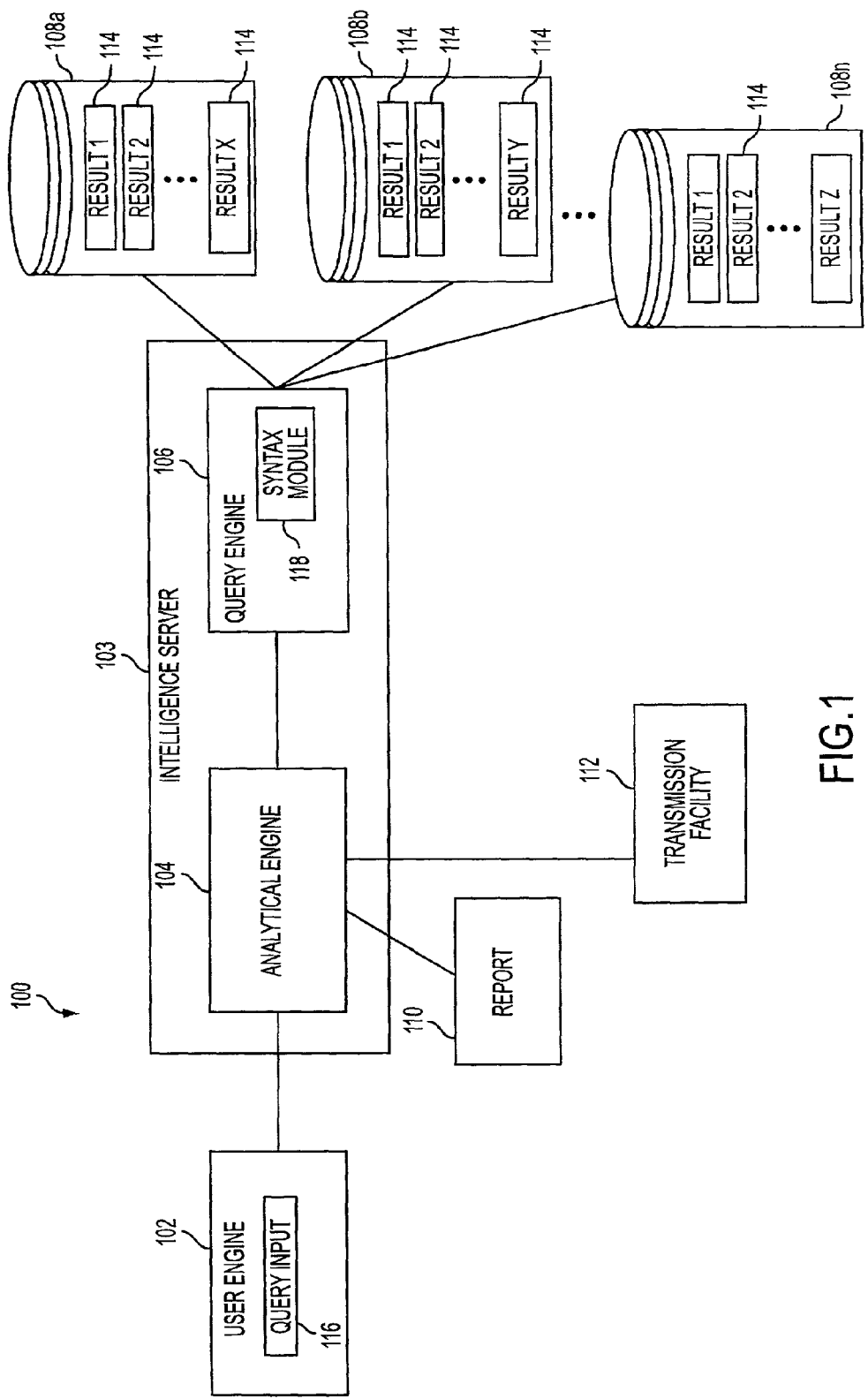
FIG. 1 illustrates a network architecture according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the Micro Strategy 7 and 7.1 platform, the details of which will be appreciated by one of ordinary skill in the reporting and decision support system art.

Figure 2:
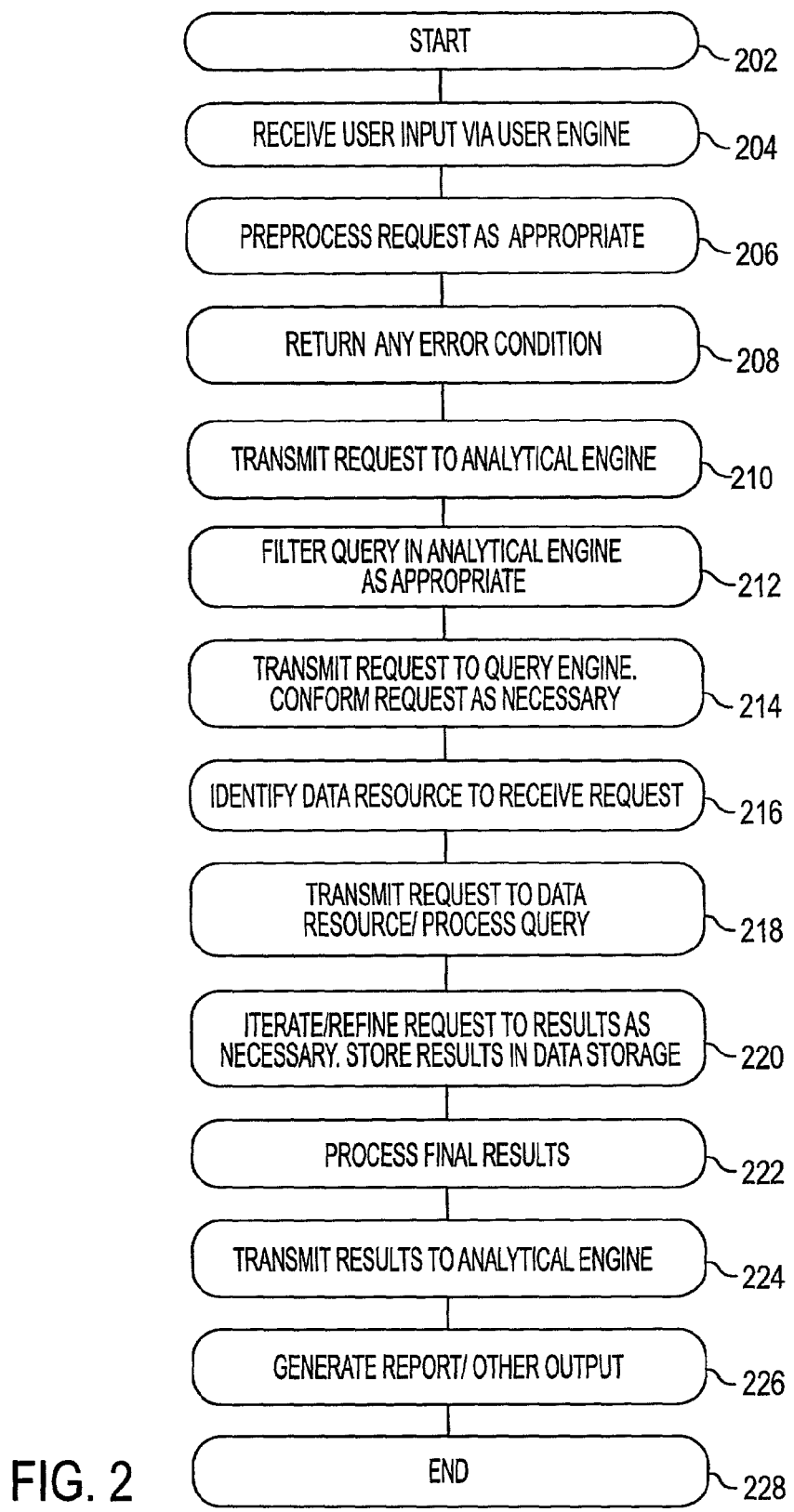
FIG. 2 illustrates a flowchart of query engine processing according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

As discussed above, the present invention provides the ability to use prompt objects to define a report. The following section describes the terminology used in understanding how reports are resolved with prompt objects.

A prompt object is a part of a report's definition that is bound at report execution time, instead of report construction time. When the report is executed, a user supplies an answer to complete the prompt object.

A report is defined by defining the objects that make up the report. According to one embodiment of the present invention, part or all of the definition of an object in a report may be replaced with a prompt object. When the report is executed, the user is prompted to provide the missing parts of the prompts found in the report's objects. Prompts have several uses, including the following. Prompts enable untrained people to "specify" a report instance. A power user constructs a report using prompt objects. An untrained person is able to select and execute the report. They then answer a series of prompted questions to determine the exact parameters used to execute this report instance. An untrained user does not need to know how to use either any object editors, or even the any object wizards, but instead answers questions posed in their own frame of reference. A large installation may have many users of the data warehouse who have no authority to modify the metadata in any way. Prompts give such users the ability to 'modify' a report without changing the metadata. An experienced user may use prompts as a way of executing several similar reports. The user executes the same report several times, giving different values for the prompt on each occasion.

The basic functionality of prompts is to "ask a question and get an answer." Additionally, prompts may provide the following additional features. Prompts can be shared between several objects. When several objects in a report use the same prompt, the question may be asked only once. Each prompt may have a default value. This value can be used when the report is executed offline (e.g., through the use of the scheduler). This value is also useful to the GUI when presenting a prompt to the user. Depending on the type of question that a prompt object asks, a creator of a prompt object may express restrictions on the set of values that are acceptable as answers of the question. The system may thus validate the answer to a prompt. Answers given to any or all of the prompts in a report may be saved. When a report definition is given to the report server to be executed, the saved answers may be used instead of questioning the user. When the report server asks the GUI to resolve a prompt, the report server makes the saved answer available for possible use by the GUI. The answers saved from one report can be applied to the execution of a different report. It is possible to specify that a saved answer to a specific prompt should be used without prompting the user to answer the prompt again. In this case no call back may be made to the GUI to answer these prompts.

According to the present invention, a prompt is provided as a prompt object. As such, the following benefits are realized. The flow of control algorithm regularly calls for prompts to be passed from one place to another. The DSS Object is the level of granularity at which that information is transferred. If a large filter contains a single, small prompt, the entire filter does not have to be sent to the client to answer the prompt. Also, prompts may be shared much more easily. Implementing prompts as separate objects enables prompts to be shared because it may simply be referenced to as an object. If prompts were part of the object that contains the prompt then it would be very hard to support sharing since one DSS Object would have to point to part of another object. It would be difficult to decide which of the two objects that share the prompt actually contains the prompt.

Prompts as separate objects make it much easier to write a light client application that executes reports. The client application responds to prompts but does not need to incorporate knowledge of the interfaces used to describe application objects.

There are a number of objects involved in prompt resolution as discussed below. An application object is an object created by an "Agent-level" interface. Application objects are used to define reports. The principal application objects are report definitions, filters, templates and metrics. Each application object can be viewed as a collection of properties. These properties are grouped together into interfaces. An object is defined by specifying a value for each property.

Application objects contain prompt objects that then replace parts of the application object's definition. The application object records information about how the prompts that it contains should be resolved and in particular how they should be related to prompts in other application objects.

Prompt objects (questions)—A prompt object is an entity that can be associated with an application object as well as properties in the application object. An application object may have multiple prompts, each replacing different properties of the object, and the same prompt object may be used several times but there cannot be more than one prompt for the same property.

A prompt object includes a question. The designer of the prompt object supplies a question for the server system to ask to fill in the gap in the object's definition. Many different types of prompts may be provided. The type of prompt object corresponds to the type of data that constitutes a valid answer to the prompt question (e.g., a number, a string, a filter object, multiple filter-objects, a template unit etc.). A prompt may also contain information used to validate an answer, and a business explanation of what the question means. It may contain a default answer to use if the user declines to answer the question.

Resolution objects (answers)—The process of resolving prompts is the process of binding an answer to each prompt question in the report instance. A resolution object may comprise a collection of answers.

While a report instance is being executed, a collection of answers is built up in the resolution object. In addition, a resolution object may be used to hold the list of unresolved prompts and to provide a context for resolving the report instance. There is preferably a one to one relationship between prompts that appear in the resolution object, and questions that are asked to the user. This becomes an issue when a prompt is used several times in the same report instance. The definition of the report specifies which of these instances of the prompt are to be merged into a single question. The resolution object will preferably hold one instance of the prompt for each time that the question is to be asked, not for each time that the prompt appears in the report instance.

A resolution object is preferably a persistent object. A user may save a resolution object to metadata. When a report executes, a saved resolution object may be used to answer some of the prompts in the report instance. Another use of a saved resolution object is that it can be used to modify the 'default' answers to the prompts in a report.

Report instance—A report instance object represents a particular execution of a report. It contains the exact report definition, filter and template used for the report. It may contain an application-objects table that contains the exact version of other application objects used for this report execution. A report instance preferably contains a single resolution object. The resolution object contains the answers given for the prompts when this report instance was executed. The report instance object contains numerous other properties that are built up as the report is executed. Most notably this includes SQL and the result set.

One other useful property of the report instance is "Job." This returns the job object (if known) used to execute this report instance. Internally, a JobID is stored in a report instance to match report instances with jobs during report execution.

Figure 3:
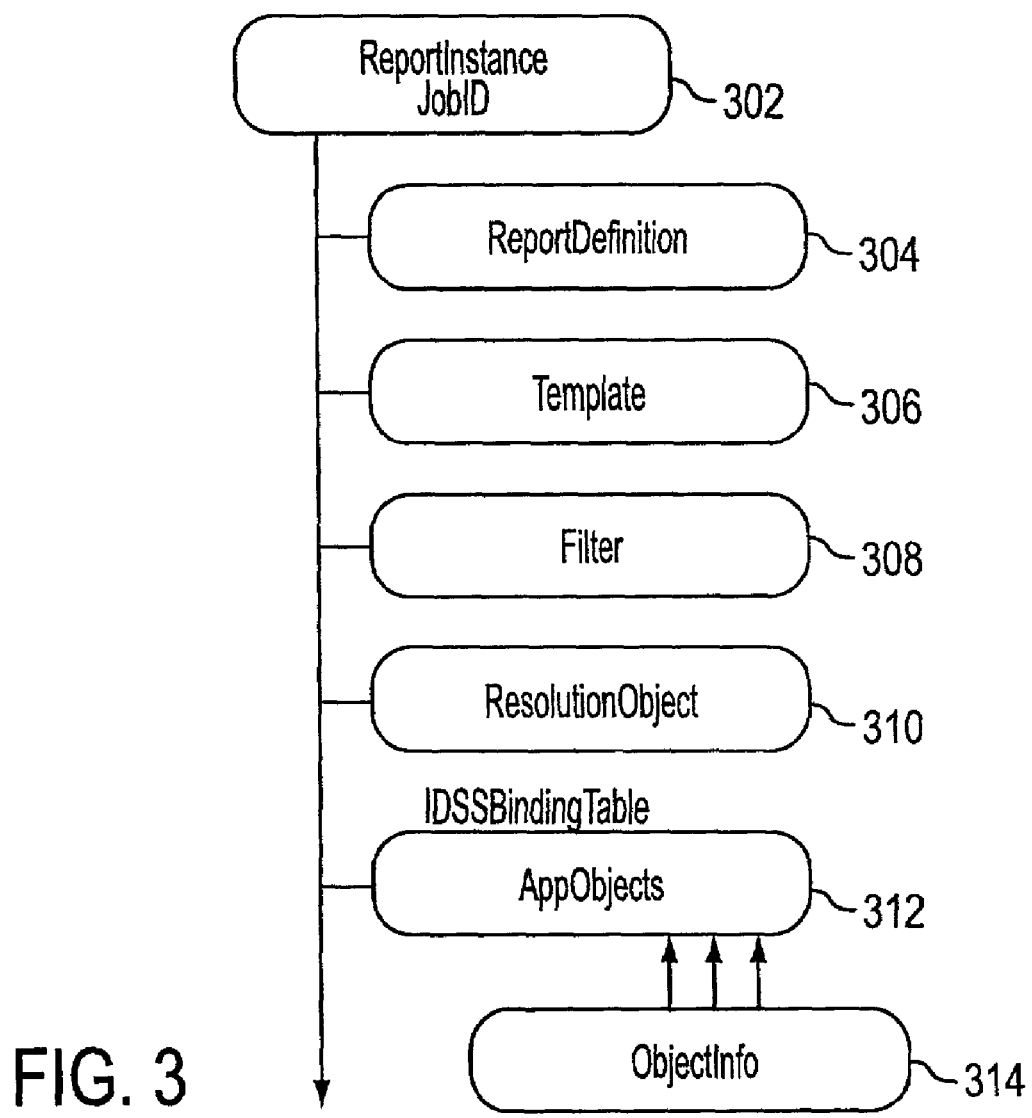
FIG. 3 depicts a flow diagram of the relationship between components of a report instance according to an embodiment of the present invention.

FIG. 3 illustrates an example of an object map of a report instance. A report instance 302 is a specific execution of a particular report. A report instance has a job ID as described above. In addition, each report instance 302 is associated with a report definition 304, a template 306, a filter 308, a resolution object 310, various other application objects 312, and various object information sources 314.

Figure 4:
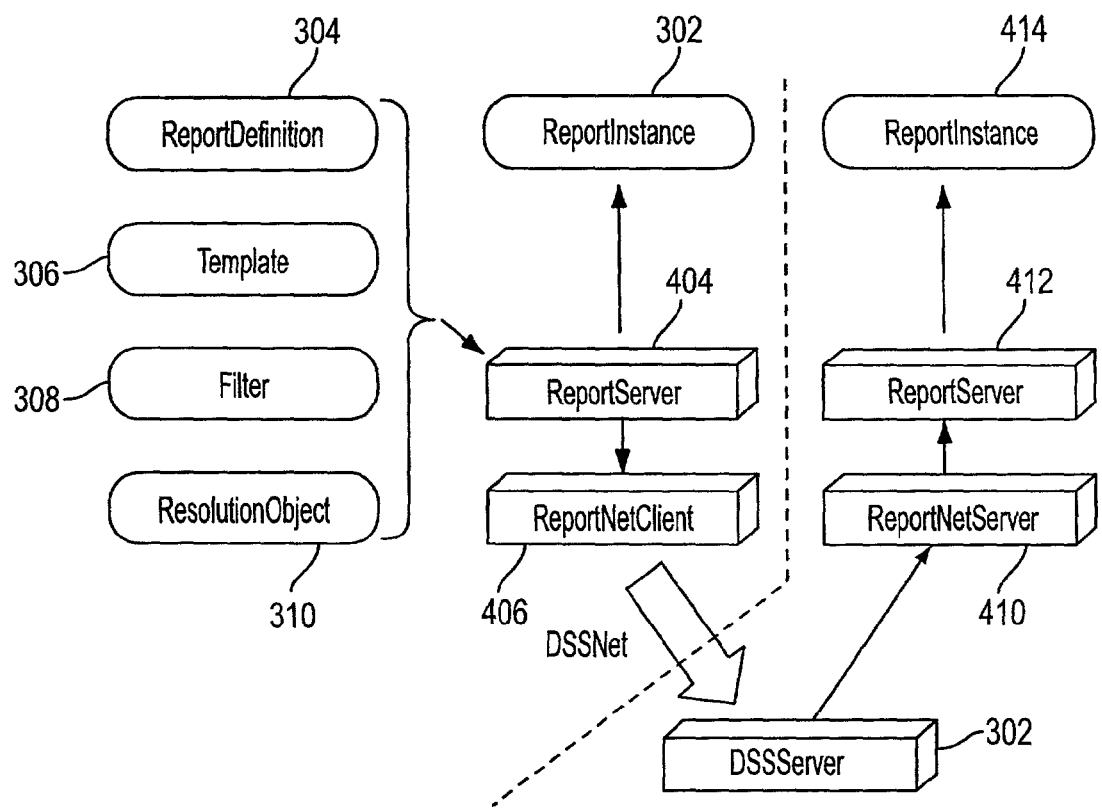
FIG. 4 depicts a schematic diagram illustrating prompt object report initiation according to an embodiment of the present invention.

Prompts are executed as part of a report but entail additional steps from the ordinary report execution. Control flow for prompt execution generally involves execution start, acknowledgement, resolution, and prompting the user to complete resolution. FIG. 4 shows an illustration of how execution starts in a three-tier environment. A two-tier architecture may also be used with a report execution in place of an intelligence server and without report net objects. To execute a report, the system determines a report definition 304 or a filter 308 and template 306.

In one example, execution begins when the client calls methods on a report server 404 to create and execute a client-side report instance 302. There are several ways that this can be done. The client may supply a report definition 304, which includes a filter 308 and template 306, or may supply the filter 308 and template 306 separately. A resolution object 310 may also be created or, the client has an option to copy an existing resolution object 310 into the report instance. This allows the client to provide answers to some prompt questions before they are asked. According to an embodiment of the present invention, it should be appreciated that resolution objects may be created for users by third party systems or as part of the system of the present invention and stored. When a report is to be executed, then a resolution object may be specified for the report to use in execution so that the user does not have to answer prompts at run-time. The answers may be generated and stored in an resolution object and used to process the report.

For example, if a report is scheduled as a part of a subscription service as described, for example, in U.S. Pat. No. 6,154,766, commonly assigned to MicroStrategy, resolutions objects may be created for subscribers to the report, associated with the report and then processed with the report when the service is scheduled to result in personalized reports based on the answers to prompts provided in the report. As part of that process, the prompts may be generated and provided to the user beforehand and stored.

Preferably, a client-side report instance 302 is then created, but if the object definitions are not already loaded on the client, population of the client side report instance may be delayed. Next, a report server 404 calls a report net client 406 to transfer the execution request to an intelligence server 408. Report net client 406 comprises a system that constructs and receives report execution messages on the client side preferably. Server 408 then uses a report net server 410 to decode the message. A report net server 410 may comprise a system that constructs and receives report execution messages on the server side. Report server 412 determines if the cache was hit. Assuming there was no cache hit, the report server 412 creates a server-side report instance 414 for this report. Control is returned to the Intelligence server 408. Through this process, a client side report instance 414 is created for execution.

Figure 5:
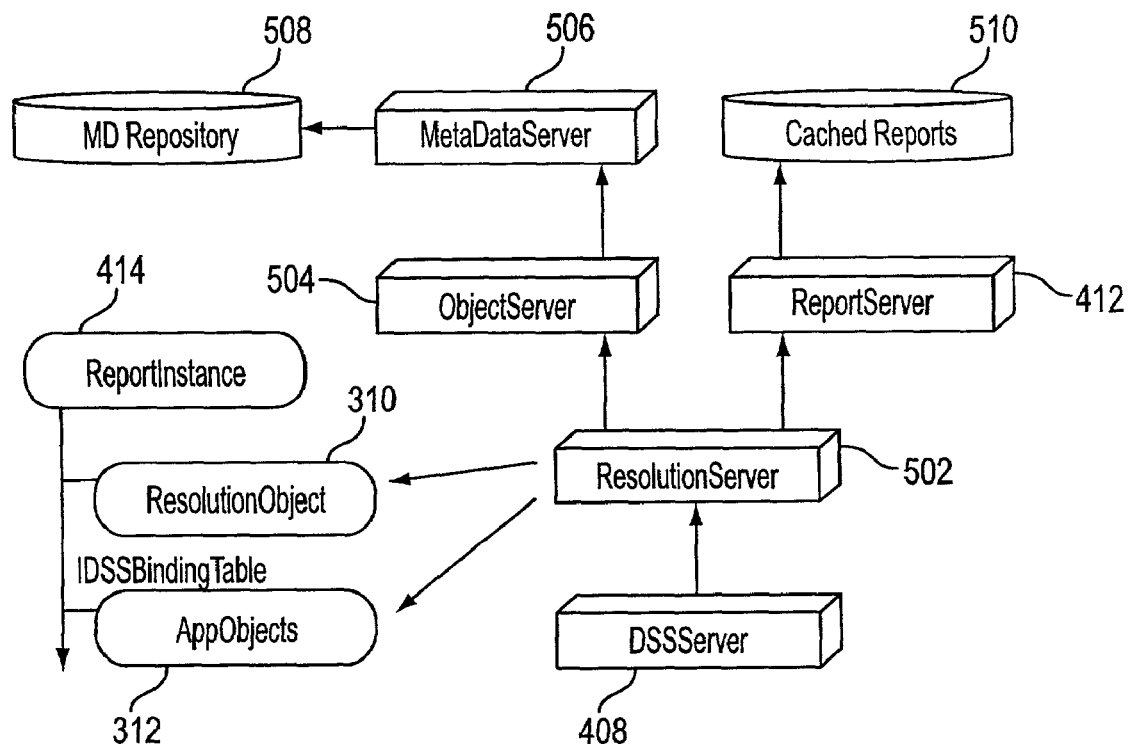
FIG. 5 depicts a schematic diagram illustrating prompt object report resolution components according to an embodiment of the present invention.

Next, report instance 414 may be optionally acknowledged as illustrated in FIG. 5. Server 408 creates a job to execute the report. The JobID is provided to the client-side report instance so that the user can inquire about the job's progress. Intelligence server 408 sends a standard message back to the client, and report net client 406 interprets the message as a job acknowledgement. It writes the JobID into the client-side report instance. From time to time server 408 may send progress report messages, and other messages to the client. The client handles them in a similar way to acknowledgement messages. The difference is that the client may raise an event with the user when it receives a progress report message.

Next, after acknowledgment, resolution occurs. First, the report is resolved by loading the application objects 312 into report instance 414 and discovering prompt objects contained therein. Intelligence server 408 passes report instance 414 to resolution server 502. The resolution server performs the resolution action on a report instance. This action involves several logically distinct, but physically intertwined actions, including loading a version of each application object into the binding table, identifying the prompt questions to be answered, storing that information in the resolution object, incorporating the user's answers to prompts by extending the binding table, and identifying new prompts. The resolution server uses an object server 504 to get current versions of the objects in report instance 414.

Object server 504 supplies DSS objects used during execution and acts as the gatekeeper to a metadata server 506. It stores references to these objects in the report instance's AppObjects table 312. Object server 504 uses metadata server 506 to load in missing objects from metadata repository 508 (if there are any). If resolution server 502 was started with its 'CacheOnly' flag set, and it is tasked to load in additional objects, then resolution server 502 abandons report execution at this point and passes control back to Intelligence server 408. Resolution server 502 obtains the complete list of prompts in report instance 414. It stores a list of prompts in resolution object 310. It detects whether or not report instance 414 has any outstanding prompts. If there are prompts, but each one of them is answered, then resolution server 502 asks report server 412 to check its cache 510. It is possible that a cache hit occurs here that was not available earlier. In either case, control is passed back to Intelligence server 408.

Figure 6:
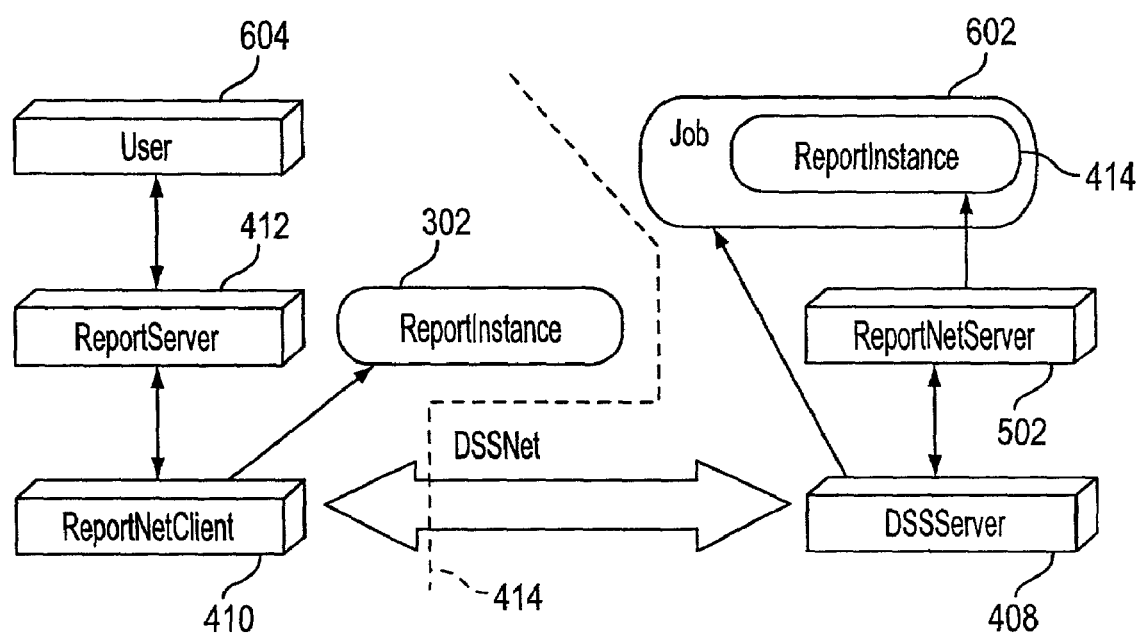
FIG. 6 depicts a schematic diagram illustrating user prompt execution according to an embodiment of the present invention.

At this point, the user is prompted. The prompting process is illustrated with respect to FIG. 6. Intelligence server 408 examines report instance 302 to determine what to do with it next. If it finds that execution is completed (or an error occurred) then it returns report instance 302 to the client. Likewise, report instance 302 may tell server 408 to pass it to another server.

If there are unresolved prompts, report instance 414 asks server 408 to pass it back to the client. Intelligence server 408 passes report instance 414 back to report net server 502 which prepares a message containing the information the client is likely to use to answer the prompt. Intelligence server 408 may then put its job into a sleep state, but may maintain the server-side report instance. Report net client 410 adds information to the client-side report instance 302, (and it may add objects to the client-side object server). It raises an event on report server 412. Which raises an outstanding-prompts event with the user. The user resolves the outstanding prompts in resolution object 310. The user returns from the event when this is done. Report net client 410 creates a return message. Changes in resolution object 310 are sent back. Report net server 502 amends the server-side report instance 414. It relies on Intelligence server 408 to pass it the existing report instance. Again, as another embodiment, a user may be prompted from an intelligence server 408 through a web server through web dialoging systems such as one offered by MicroStrategy web.

In some events, the user's answers to the first prompts may cause further prompts to be triggered, or more application objects to be loaded. So Intelligence server 408 follows up on a client's prompts by passing the report instance back to resolution server 502. This process continues until all prompts are resolved.

An embodiment of prompting from the user's perspective is now described. First, the user obtains a session. From the session the user has an IDSSSource interface (OS) to the object server, and an IDSSReportSource interface (RS) to the report server. The first interface is used to obtain objects and the second interface is used to execute reports.

The user then creates a report instance that is to be executed by finding or creating either a report definition object, or a filter and template object. The user does this with object server 504. Then the user does one of the following actions. First, the user may call a method on one of the DSS objects to create a report instance and start executing it synchronously. Second, the user creates a report instance. The user then calls an execute command on this instance. The advantage of this manner of executing reports is that it allows the user to execute reports containing objects that have not been saved to metadata. The user may also edit the objects in the report instance before execution starts. Or third, the user may create and execute a report instance. These methods are used to execute objects that already exist in the metadata. In this process, the user may avoid the step of loading the definition of report objects to the client machine.

As resolution server 502 finds prompts in the report instance, it accumulates them in resolution object 310 of report instance 414. Execution continues for as long as possible, but eventually the system obtains an answer for each prompt.

The resolution server examines a report execution flag recorded in the report instance. If this flag is set, then the prompts are answered in a default manner without prompting the user. Either execution can continue, or some prompt in the report has a default setting that requires user input to continue. In the latter case the report execution fails.

Otherwise the resolution server seeks help from the user to continue. Control is passed back to report server 412, which sends an event to the user to resolve the prompts. There may be three responses to the prompt. These are to abort execution, continue execution (after answering some prompts), and the default action, which means that each prompt is answered in whatever default manner was defined when the prompt was included in the report.

Resolution server 502 populates report instance 414 with properties that it generated from the definition and prompts. The following three properties may be used: ResolvedDefiniton—the DSS ReportDefinition object for this report instance; ResolvedFilter—the DSS filter object for this report instance; and ResolvedTemplate—the DSS Template object for this report instance. In each case the property contains an object based on the original object (Definition, Filter, Template) but with substitutions made for the prompts. If there were no prompts then these properties are left to the original object. Objects other than these may have been substituted. The version of the object from the binding table is preferably used rather than the object from the object server. Subsequent stages of report execution use the resolved objects, not the original objects. In particular the final grid is based on the ResolvedTemplate, not on the original template.

After execution has completed, a user can modify the report instance, and then ask to execute it again. Unless the user provides a special setting (e.g., do cross-tabulation only) the report instance determines what changes are to be performed. Changes to the resolved objects cause the cross-tabulation (e.g., layout changes only) or SQL generation (e.g., contents changes) actions to be performed again. Changing the resolution object, or the original report definition, filter or template cause the resolution stage (and hence engine, etc.) to be performed again. Changing the definition of one of the other objects is not detected.

Prompt resolution occurs according to a default order set by the system. If a report creator desires to provide a different order, then the following additional feature may be utilized. A report may be provided a collection of prompt instances that, when populated, specify the order of resolution of the prompt objects in the report to override the default order.

While the basic operation of prompt objects and the resolution process has been described, it should be appreciated that numerous modifications and advanced uses are also provided, as described below.

It may be desired to enable this order of prompts being resolved to be set by a user. For example, in general, each application object may contain a collection of one or more prompt objects. The same prompt may appear multiple times in an application object. An application object records information about how its prompts should be resolved. This information includes the order of resolution, explanation messages for the user and whether the prompt is asked as separate questions or merged with other instances of the same prompt. The resolution object contains a prompt instance for each separate question that might be asked to the user. This collection can be accessed in two ways: in resolution order (this presents the prompts in the order in which they should be resolved, with each prompt instance indicating from which object (or objects) it comes) or based upon an object and prompt identifier (this pattern of access is needed to determine the answer recorded for a specific prompt object).

By default, prompts in objects are resolved without reference to the relationships between the objects. However when one application object (the parent or container object), contains a reference to another application object (the child or dependent object) the parent object may override the prompts in the child object through an import/export mechanism described below. The parent object may elect to export one or more of its prompts. The child object may elect to import one or more of its prompts. If the child object is used in an object that exports a corresponding prompt then the resolution server will use the prompt from the parent object instead of the prompt in the child object. The child object's prompt is not passed to the user for execution. An application object might specify that a prompt should automatically be closed as soon as it is detected in a prompt.

One aspect of the present invention relates to making each prompt a separate DSS object. In addition to the properties of a prompt object described above a prompt object is also defined by principle properties of the prompt interface including the following described in this paragraph. Type: Indicated the type of data expected to answer to the prompt; Validation properties: Each type of prompt may have properties that restrict acceptable answers for this prompt (These properties are used to validate any answer that might be given and the nature of these properties depends on the nature of the question asked by the prompt); Prompt properties: Each validation property may be replaced by a prompt (This allows a user to define a prompt whose valid answers depend on a previous prompt); Exports properties: As with all types of objects that refer to objects that might contain prompts, prompt objects contain export collections to contain the prompts exported to the dependent objects; Default: Each type specific interface may have a 'Default' property (This property holds the default answer given to this prompt, if any is known, which can be overridden when a prompt is used in a particular object—The default value may not directly contain prompts, but it may contain objects that contain prompts) Title: A string used to introduce the question; Meaning: An extended explanation (i.e., a string) about what the question means (for example, this might be something like "The summary report will exclude all divisions whose total revenue was less than this amount."); Reuse: A prompt records information on how the systems responds when presented with an instance of the prompt from a previous report execution (whether prompt the user again or use the prompt's previous value or default value as the default answer); Properties: The prompt has a DSSProperties interface; Merge: This Boolean property indicates whether different instances of the same prompt are merged into a single instance; Index: The index number of a prompt instance in its application object (for multiple use of the same prompt object); Importable: True if the prompt instance may be replaced by a prompt imported from the prompt's container; ImportAs: Used if the system is to import a prompt instance as a different prompt object; ExportsTo-Prompt: Collection of exports the prompt's container into the prompt (each export describes another prompt instance in the same application object that corresponds to a prompt inside this prompt instance); Answer: This property returns the value chosen by the user to answer this prompt (or the value used if the user declines to answer the prompt); Locations: The places where the prompt is found; Closed: True if the prompt has been answered; Used: True for a prompt that is used in the report instance (allows a user to distinguish between prompts that are really used and prompts whose sole purpose is to store a previous answer); the latter prompts are useful if a user expects the prompt to come up later in the resolution process); Incomplete: True for a prompt that cannot be answered because its validation properties depend on another prompt; Locked: True for a prompt which has already been answered, but whose answer cannot be changed (a prompt may be locked if the prompt's answer was used to build another prompt's validation properties); Previous: This property is only available at report execution time. If the user provided a previous resolution object, it contains the Answer for this prompt in the previous resolution object; and HasPrevious: True if a prompt has a previous value.

A prompt object can be used in one or more of the following ways. The simplest way is as a DSS object. This is an object stored in the metadata. The second way is as a prompt instance embedded in another object. This is generally like the metadata object, but the other object may override some of the properties. The third way is as a resolved (or to be resolved) prompt in a resolution object. In this case the resolution object fills in additional properties about the specific usage of the prompt. FIG. 7 indicates what properties relate to the resolution object, prompt instance and prompt object.

Greater details of how some of these properties may be applied are provided. One such property is the reuse property. To use a prompt object, one is obtained from either a new creation or an existing prompt object. The default behavior is to merge all instances of the same prompt object, so a user should reuse an existing prompt object if the user wants to ask the question that it represents only once.

If a user does not want to reuse the prompt object, then the object may be embedded in whatever application object is going to use the prompt. Externally the prompt object appears to be part of the application object. However only its container, or another object in the container, can use an embedded object.

The reuse property indicates how the system operates when a prompt is reused, or when to mark a prompt as closed. This value is stored as part of the prompt object. It can be overridden in a prompt instance that is not merged with other instances of the same prompt. In other words a prompt instance that has the merge property set to 'False' can assign its own value to the reuse property.

The reuse property may be used as follows. When a new prompt is detected, an entry is created in the resolution object to hold the answer for the prompt. This prompt question has a Boolean property, closed, that is used to indicate whether or not the user has answered the question. Normally this property is set to "False" to indicate that the user has not answered the question. However the setting of the reuse global property can be used to "auto-close" the prompt. The question is marked as already answered as soon as it is detected. This implements a "do not ask me this question again" feature. The reuse property indicates the circumstances under which the prompt is closed automatically, and to which value it is closed. The reuse property is also used to determine what to do if the user declines to answer a prompt.

Figure 8:
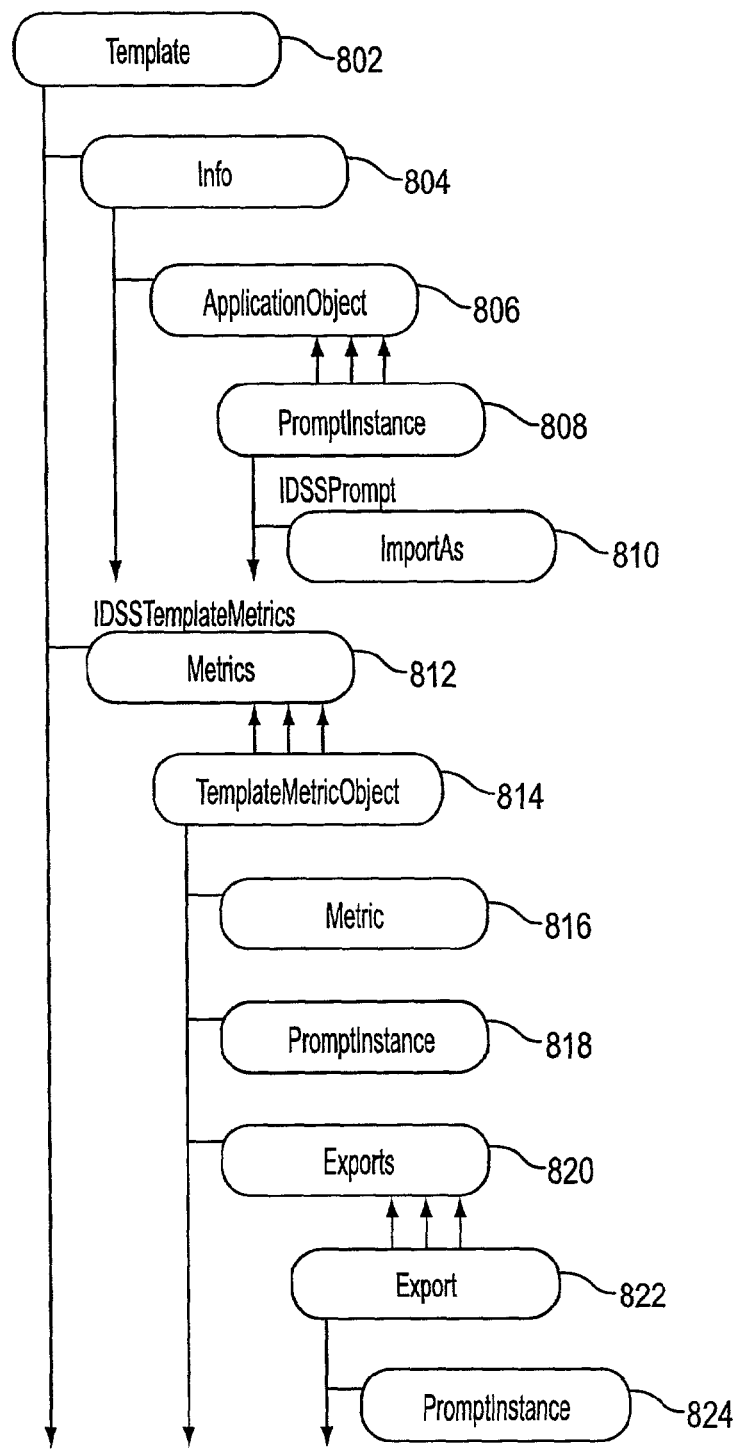
FIG. 8 depicts a schematic diagram illustrating an example template with prompt objects included according to an embodiment of the present invention.

FIG. 8 illustrates an overview of the properties and objects associated with using a prompt instance. In this example, the application that contains prompt instances is shown as a template 802. It should be appreciated that filters are also application objects and the example of FIG. 8 may be applied to filters as well. Templates 802 contain various information blocks 804 including application object 806 which contains a collection of all of the prompt instances that appear somewhere in this particular template. Thus, application object 806 references all of the prompt instances 808 with each prompt instance relating to a single prompt object. Further, the prompt instance may contain an import as 810 reference which records how the prompt can be imported from the report definition that exists outside of the template. The template 802 also comprises a plurality of metrics 812 as shown. For each metric that appears in a template, there is a template metric object 814 which comprises a metric element 816 if the metric is explicitly known. If, however, the metric is to be defined by a prompt, then the prompt instance 818 is included within the template metric object 814. If prompts are exported from the template into the metric property, then there is export box 820 which includes exports 822 with each of the plurality of prompt instances 824. Below, prompt instances may be used in the various ways. First, a prompt instance may be inserted into another object. Thus, a prompt instance may replace properties in another object. If a user wants to use a prompt instead of the normal property they assign the prompt to the prompt-valued property. Following this assignment the application object creates a prompt instance based on the given prompt object. The way to obtain the prompt instance is to read back the value of the prompt-valued property. The prompt instance appears to be the same as the prompt, but may not be the same object.

A user can override the title and meaning properties of a prompt instance without affecting the prompt object. This ability allows the same prompt object to be used multiple times in an application object.

The application object maintains a collection of the prompts that are being used in the application object. Whenever a user adds a new prompt object to the application object, the collection is extended to contain the new prompt object. The collection returns the prompt instance, not the prompt object.

If the user inserts a prompt object into the application object that it is already using it, the default behavior is to give the user the existing prompt instance. This means that by default if a user puts the same prompt object in an application object in several places, the question is asked only once. If a user wants to have several instances of the same prompt object in an application object, then the user directly inserts a second instance of the prompt into the collection. Then the user assigns the prompt-valued property with whichever instance (drawn from the collection) the user wants to use.

The prompt-instance collection cleanly handles multiple use of prompt objects within a single application object. It indicates which order the prompts should be presented to the user, and whether or not the same prompt should be asked twice. The default is merger, but the merge property allows the boolean input on that point. This property is stored at the prompt instance level. The resolution server merges together prompt instances (of the same prompt object) that it finds that have merge set to 'true.' They are presented to the user as a single prompt to resolve. If this property is set to 'false,' for a particular prompt instance, then the resolution server does not merge that particular prompt instance in with other prompt instances (of the same prompt object) found on other application objects. If merge is set to false, the user is only prompted once for each distinct application object that contains a prompt instance, even if the application object appears several times in a report. If a designer wants to use an application object twice in a report, and prompt the user twice, once for each usage, then the designer uses the prompt import/export mechanism described below. To avoid contradiction, in one embodiment, two distinct instances of the same prompt object in the same application object to are not permitted to both have merge equal to true. Other properties of the prompt object may be modified at the level of the prompt instance such as default, reuse, importable, import as, and exports to prompt.

There may be situations in which a user wants to have finer control over how prompt objects are resolved. For example, the user might want to specify that a prompt on a child object is resolved before a prompt on a parent object, or that there is a more complex merging structure than the one shared instance, and multiple singleton instances structure provided by the Merge property. An object can import prompts from another object that uses this object as one of its dependents. An object can export prompts into its dependent objects. The effect of this operation is to merge prompt instances between the parent and the child. The user is prompted with the prompt instance from the parent. The answer to this instance is used as the answer of both the parent and the child prompt instance. The import/export mechanism provides us with a way to explicitly merge prompt instances between a parent and a child object. By being selective about which prompt instances in the parent are merged with which instances in the child, a user can impose a complex merging structure. Since prompts are resolved from parents before children a user can impose a different ordering on prompts from children by importing them all to the parent. The order in which the prompts are resolved in the parent then takes priority.

When a prompt instance is exported from a parent object to a child object, the prompt in the child is replaced with the prompt from the parent. In particular the properties of the child prompt instance are ignored on the grounds that the user is not prompted with the child prompt instance. For example, the user may be prompted with the title and meaning of the parent prompt instance, not of the child prompt instance.

Figure 9:
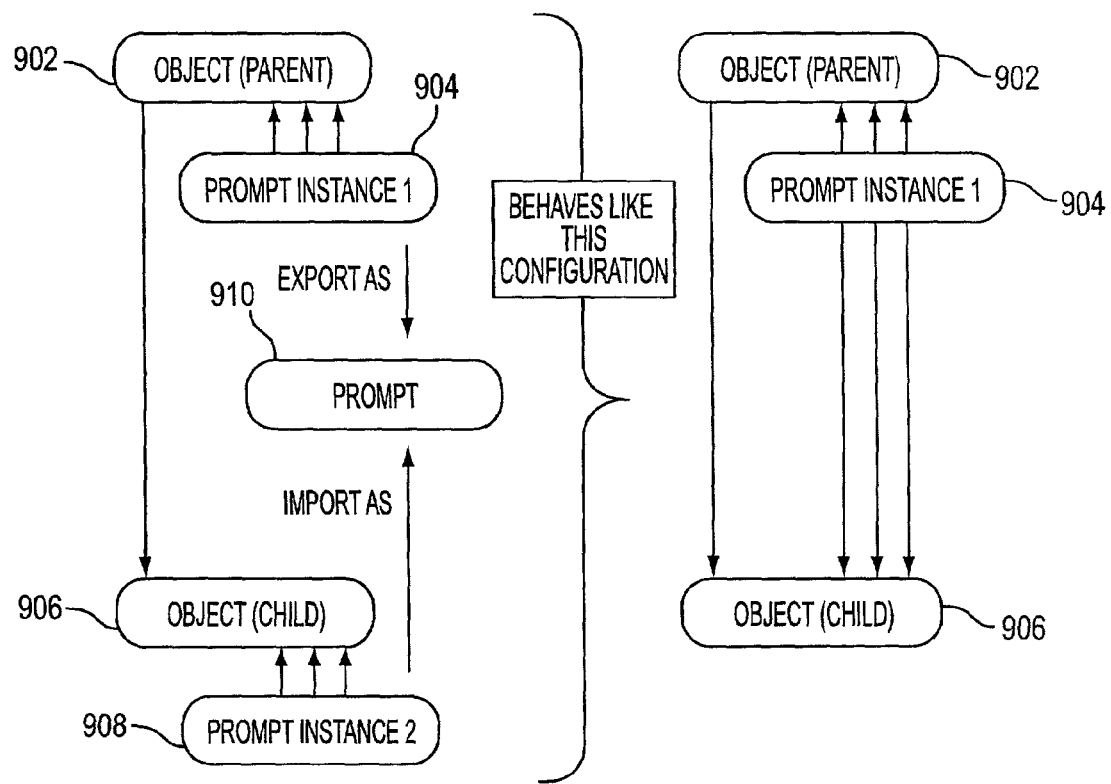
FIG. 9 depicts a schematic diagram indicating use of a prompt object used by a parent and child object according to an embodiment of the present invention.

FIG. 9 illustrates this situation. The designer specifies a report with two objects: object 902 and object 906, each object with its own prompt instance—prompt instance 904 and prompt instance 908, respectively. The designer also specifies that the parent object 902 exports its instance 904 and the child object 906 imports its instance 908. The resolution server determines that the imports and exports match as prompt 910. It then discards the prompt instance 908 of the child object, and instead applies the prompt instance 904 of the parent object to both the parent and the child.

Each application object contains a collection of prompt instances. Each prompt instance on the application object has a boolean property called importable. This property defaults to 'False.' If the designer sets this property to 'True' for some prompt instance then the resolution server considers importing another prompt instance into the application object to replace the prompt instance. The importable property indicates that the prompt instance might be replaced by a prompt instance imported from a parent application object.

An application object may also export prompt instances from its collection of prompt instances into one of its dependent application objects using a collection called exports. Each dependent object (which could contain prompts) may have its own collection. If the same child object appears as a dependent in two different places inside the parent object then there are two collections, one for each instance of the child object. A designer may export different prompts into each instance of the child object. The exports collection for a child object always appears in the same interface as the child object. The collection records information about which prompt instances from this object are exported into the child object. As with the importable property, exporting a prompt instance into a dependent object merely indicates a willingness to export the prompt, not a requirement to export the prompt. The prompt is only exported if the dependent object also imports it.

With regard to the import/export functionality, the resolution server matches the imports into a child object with the exports from its parent. When it finds a match it uses the prompt in the parent object instead of the prompt in the child object.

Imports and exports may be matched together in many ways, including a process of comparing the ObjectID of the imported and exported prompt instances. In other words they match if they are both instances of the same prompt object. The advantage of this approach is that it allows a designer to add or remove prompt instances (based on other prompt objects) from either the parent or the child object without breaking the import/export relationship.

If a designer wants to match together two instances that are based on different prompt objects, both the importer and the exporter are able to 'rename' the prompt object. The designer may specify any prompt object that the resolution server should use in place of the prompt instance when matching imports and exports. If the designer wants to import two different prompt instances based on the same prompt object, the designer may assign an ExportIndex number to each export.

For the first case prompt-object properties called ImportAs and ExportAs are used to 'rename' a prompt instance. These properties default to the prompt object that underlies the prompt instance. When the designer indicates that a prompt instance could be imported by setting Importable to 'True' she may also set the ImportAs property of the prompt instance. This property's value is a prompt object (not a prompt instance). By specifying a different prompt object, the designer can make the application object represent the prompt instance as a different prompt for import purposes. The designer can set this property to any prompt object that has the same prompt type as the prompt instance.

Multiple exports keyed to the same prompt object are resolved by using an index number. The resolution server identifies each import and export by assigning a key that contains a prompt object and a number to the import or export.

Another aspect of the invention relates to the ability to provide prompts in prompts. A prompt may also contain a prompt collection and prompt instances of its own. Prompts may be used as part of the validation parameters of another prompt. Also, a prompt may be defined as a structure of ordinary objects with prompts embedded inside the structure—called a draft prompt. For example a prompt can be defined as an expression containing other prompts.

The prompts that a prompt contains are part of the prompt object. In one embodiment, they cannot be modified when a prompt object is used in a prompt instance. A prompt object can also import and export prompt instances in the usual manner. Within the definition of a prompt object, prompt instances from the prompt object's instance collection may be exported to other application objects that are dependents of the prompt.

An example of this is a prompt object that asks a user to "choose a city" with a validation property saying that it is valid only if the city is located in a "choose a state" prompt object. That could be extended again to say that the answer to the "choose a state" prompt object imposes validation to a "choose a region" prompt object, etc. That prompt-in-prompt situation is resolved in reverse order by first asking for region, then state, then city. A nested relationship of prompts is thus possible.

In addition, there may be circumstances where the report designer desires for multiple answers to be provided for each occurrence of a prompt object in a report rather than, by default merging the two prompt objects into one.

To suppress the default property, a user may set the merge property to false. If Merge is set to 'False' then each prompt instance (i.e., specific usage of a prompt in a specific object) is prompted separately. The answer is still asked once and the answer applied to the various instances of the prompt object in the report. However even if some application object appears twice in the report, the prompts in the object may only be asked once, and the answer may then be used every time the application object is found in the report.

To enable an prompt object to be asked separately, the import/export facility according to the present invention may be employed. Specifically, the prompt object may be imported into the prompt instance at run-time. Thus, each time the application object is used in the report, the prompt instance of the prompt object is exported into that application object. The system then treats each prompt instance as a separate question (and assuming that Merge is 'False' on these instances) so they are not merged together.

The following example shows how this can be done. Suppose that the Year prompt is defined as before, to prompt for a single integer value. Let us define the metric "SimpleInterest2" to prompt twice for a Year. The first time it prompts for the stop year, the second time for the start year. For simplicity of this example we will fix the rate to 5% simple interest per year.

A template "T2" is defined with SimpleInterest2 placed in its metrics collection twice. If the report were executed as is, then the report's result would show the metric twice. By turning off the merge functionality, execution prompts for Year twice—once for YearStart and once for YearStop. The system prompts only once for YearStart and once for YearStop, even though the metric that contains these instances appears twice in the template.

If there was a desire to prompt separately for the stop year for each metric, but only prompt once for the start year for both metrics, that may be achieved by exporting the stop year to both metrics, from different prompt instances in T2. This export distinguishes between the two instances, because they are different instances in T2. They are then prompted separately.

Figure 10:
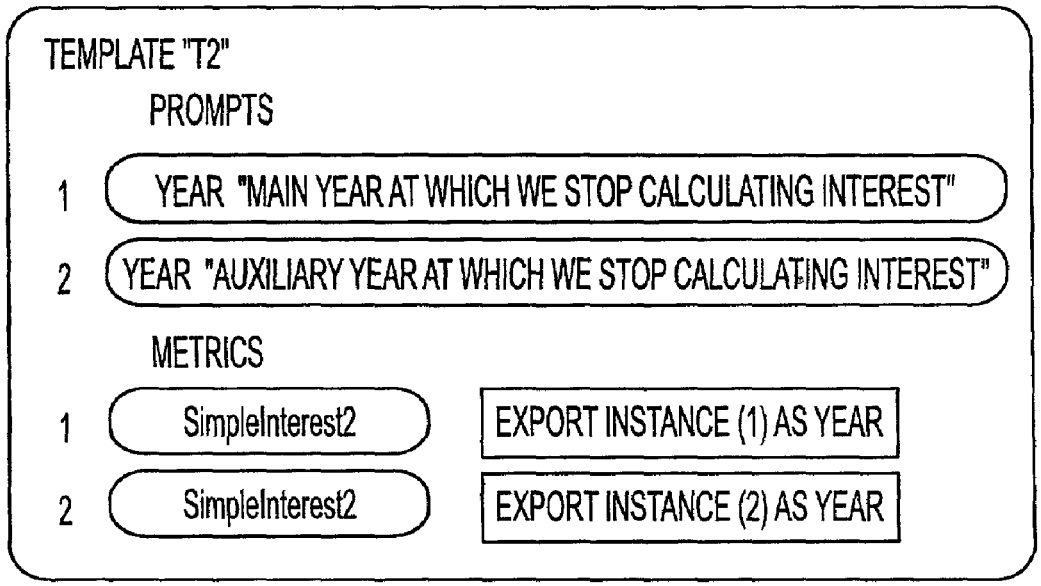
FIG. 10 depicts output of a template using a prompt object according to an embodiment of the present invention.

The settings of the prompt instances in T2 are used, rather than the settings of the single YearStop prompt instance on SimpleInterest2. This allows the designer to give them separate Meaning and Title strings. FIGS. 10 and 11a-b illustrate the picture when a report containing this template is resolved. The prompt Year is resolved to three prompt questions in the resolution object, distinguished from each other as shown in the diagram.

Another feature of the present invention involves resolution ordering of prompt questions. The resolution server determines which order to present the prompt questions to the user. A list of prompt instances is determined from the prompt instance collections of all of the objects that appear in the report instance. The exports, importable and merge parameters specify exactly which of these instances are be merged together to make a single prompt question.

One method for determining the order in which to present merged objects is as follows. The non-prompt application objects are ordered in the report instance in a topological order. This means that every object appears before its dependents. In particular, the report definition is the first object. Each object preferably only appears once in the list. This list is then expanded by replacing each object with the list of prompt instances that it contains. The list of prompt instances that are contained in the prompt instance is inserted before each prompt instance. That step is repeated recursively until every prompt instance appears at least once. Each merged instance only appears once by striking out duplicates—the first place it occurs.

The resolution object is a collection of prompts. It contains prompt questions. Each prompt question represents a single question that might be given to the user. A prompt question is obtained by merging together prompt instances from the report. One of the objectives of the resolution stage of report execution is to provide an answer to each prompt that occurs in the report instance. The resolution object collects together the prompts that appear in the report instance. There are several ways in which an answer can be bound to a prompt including the following. The answer was known in advance. This happens if a report instance is executed using an old resolution object and a suitable answer already exists in the collection. Also, the prompt may have been specified to be closed, even if there was no previous answer. Again, setting the reuse property does this. The designer can override the default value on a prompt instance to make the instance default to a particular value. A designer might do this if she wants to reuse an existing application object, but also wants to fix the value of one of the prompts in the object.

Also, the user of the resolution object supplies an explicit answer to a prompt; such as through a GUI response, a spreadsheet read or a data repository access.

An answer may be provided in the following ways, for example. The user can close the prompt to the previous value of the prompt (if any is known), the client can close the prompt to its default value, or the client can cancel the prompt. Canceling the prompt means that the client explicitly states that the prompt should not have an answer. It corresponds to the 'empty' value of a variant data type. Fourth, the client of the resolution object may explicitly refuse to answer the question. We say that our client has declined to answer. The resolution object's response depends on the reuse setting made when the prompt object or prompt instance was defined.

The default setting of reuse states that the resolution object should close a prompt to its default value if the client declines to answer it.

To prompt the user through a GUI, a client-side GUI wants to present the prompts in order. So we allow the client to access the resolution collection by index number. This access method shows all of the prompts in the resolution, whether or not an answer already exists for them, and whether or not they are actually used.

If the client uses a wizard-like dialog to present these prompts to the user, the user may be permitted to answer them in any order.

Sometimes a prompt (the 'outer' prompt) cannot be answered because the prompt is dependent on another prompt (the 'inner' prompt). To be more precise this happens when the outer prompt uses the inner prompt to define its validation properties. An answer to the outer prompt cannot be validated until after the user has assigned an answer to the inner prompt. The outer prompt is considered incomplete.

A read-only Boolean property called Incomplete may be used that is normally 'False.' However for an incomplete prompt question it returns 'True.' An incomplete prompt may not be closed until after all its inner prompt(s) have been closed. The resolution server is used to change a prompt's status from incomplete to complete. The resolution server has the power to perform substitutions of answers into prompts. The concept of incomplete prompts is why the resolution object may override the validation properties of a prompt question. By using import/export it is possible to design a report instance in which the same prompt is resolved multiple times with different values substituted in for its inner prompts. A resolution object usually presents inner prompts before outer prompts in its collection. (An exception may be if the inner prompts appear in a draft prompt). If a user examines the prompt questions in order, and closes each one and then runs the resolution server again before going on to the next prompt, then the user does not encounter an incomplete prompt.

Various methods on the resolution object can be used to modify which prompts appear in the resolution object. A client can call these methods if a client wants to add or remove prompts directly from a resolution object.

Clients can use these methods to edit resolution objects that they intend to save to metadata. However, a client preferably avoids editing a resolution object during report execution, since the resolution server may not be able to detect the changes, and it may become confused.

Since the resolution object is a collection of prompts, the usual methods to edit the collection are provided. In particular, there are clear and remove functions to take prompts out of the collection, and an add function to put prompts into the collection.

Clear works in the usual way—it removes all of the prompts from a resolution. Remove is used to remove a specific member from the collection. The member can be referred to by index number, by passing in a reference to the prompt question that is to be removed, or by using any Item parameter that can be unambiguously matched to a particular prompt question.

The add method can be used to add a new prompt question. The argument to add can either be a prompt object (in which case a prompt question is added for Merge equals 'True' instances of the prompt) or a prompt instance. If the collection already contains a suitable instance then the existing instance, is returned, and a new instance is not added.

A special functionality is provided for one resolution to combine its prompt questions with the prompts in another resolution. This functionality is provided by a "combine" method. It creates new prompt questions in this resolution, based on those in the other resolution.

A resolution object has a method CleanUp that takes no parameters. This method causes the resolution object to clean itself up by deleting all information stored in the object involved with executing a specific report instance. Only the answers given to the prompt questions are retained. This method has several effects. All location information (except the primary location) is deleted. No prompt is marked as Used. No prompt is marked as Closed. The old answer for each prompt is moved to its Previous property. Any prompt whose validation properties refer to another prompt is marked as Incomplete, and any value previously substituted into the validation properties is deleted. Other internal storage used during resolution is freed.

A user may call this method after report execution is complete if the user wants to save the resolution object used for report execution into the metadata. However, it is not necessary to clean up a resolution object before saving it to the metadata, but failing to do so may result in a substantial storage overhead, as it saves irrelevant information. Since there are legitimate reasons for a user to want to save a resolution object complete with execution information (e.g. the user wants to schedule the report to execute at a later date) the object server permits a user to save a resolution object without cleaning it up first.

A functionality is provided to resolve a specific object. This functionality is also used in report execution, when it is applied to the report definition object that acts as the starting place of the definition of the report. The operation of resolving an object means to walk through the object, and all of its known dependents, and add prompts to a resolution object for all of the prompts that are found. This process is performed by a special component called the resolution server.

The resolve method is called to ask the resolution object to resolve an object. The resolution object invokes the resolution server to scan the argument and its dependents looking for prompts. Prompts which are discovered are added to the resolution object. The resolution object is cleaned up before new information is added. The Resolve method takes an optional parameter, CacheOnly, that defaults to 'False'. Setting this parameter to 'True' ensures that no new objects are to be loaded during resolution. This functionality is essential if a client wants to use an object with prompts as a 'template' for building other objects.

The resolution action preferably fails if the resolution server detects some inconsistency in the way that the dependent objects are organized. Situations in which an error may be generated include the following.

1. There is a cycle in the dependency graph. For example, if an object A is defined in terms of an object B, and object B is defined in terms of object A, then the resolution server will refuse to resolve any report which uses either object. Where possible, editors will reject objects that contain dependency cycles, but since a single transaction is not used to save all objects involved in a report, it is possible to create this situation by editing A and B simultaneously.

2. There is a cycle in the import/export relationships. It is an error if two mutually dependent objects both export and import the same prompt to each other. It is required that import/export is used to allow a 'parent' object to take control of a prompt from its 'child.' If the import/export relationships contain a cycle it cannot be determined which object is the parent and which is the child.

3. There is a cycle in the 'incomplete' dependence between prompts. It is not acceptable for prompts P and Q to both use the other prompt as one of its validation properties. If such a configuration were permitted then both prompts would be marked as Incomplete and a user would be unable to close either prompt.

4. There is a merging inconsistency involving prompts as validation properties for other prompts. Suppose that the answer of one (inner) prompt is used inside another (outer) prompt, either as a validation property, or as a blank prompt in a draft prompt. By using multiple instances and import/export it is possible for a user to contrive a situation in which the inner prompt specified to be asked twice, and that the outer prompt is asked only once. This presents a problem because the outer prompt is to be asked once, but it is to be asked using two different values of the inner prompt.

5. The situation described in the previous paragraph for non-draft prompts may also be forbidden when only a single instance of the outer prompt appears, even though the definition does not explicitly say that the outer prompt is asked only once. This situation may be forbidden because it would be highly confusing for a user, who would be asked the same prompt twice with the same title and meaning. The fact that the two prompt instances do in fact differ (by the validation requirements applied to the answer) would not be apparent to the user.

The default behavior when a user asks to resolve an object is to clean up the resolution object before starting the resolution. However, there are many situations in which an object cannot be completely resolved with a single execution of the resolution server. For example, if one of the prompts in the resolution object is incomplete, the resolution server should be invoked a second time to make it substitute in the answer to the inner prompts. Also, if the answer to one of the prompts refers to an object that did not previously appear as a dependent, the new object and its dependents should be scanned for further prompts. And if a user closes an object valued prompt, the resolution server should be used to determine if any other prompts are exported from the newly closed prompt.

An optional parameter Repeat is provided that defaults to 'False.' A user should set this parameter to 'True' if the user wants to keep existing information in the resolution object.

Details about the various types of prompt will now be discussed. For each type of prompt a description is provided about how to read and write the values assigned to the prompt. An explanation is also given about what validation properties are available for each type of prompt.

The type of a prompt is indicated by the PromptType enumeration. For every type of prompt, an answer for the prompt is represented using a single VARIANT property. When the prompts' answer cannot be expressed as a simple value, the property returns a suitable collection object that can be used to contain the answer. Since a prompt question has up to three answers associated with it, there are three properties available to hold an answer.

First, the default answer for the prompt is held in the property Default. Second, the answer for a particular prompt instance is held in the Answer property. Third, the previous answer for a prompt question is returned in the Previous property.

There are several properties available to validate the answer of a prompt. The meaning, if any, of one of these properties depends on the type of the prompt. For some types of prompts these properties are unused. These validation properties are normally assigned at the prompt object level, and they normally cannot be overridden by a prompt instance. First, there is the property minimum (VARIANT), which is preferably the same type as Maximum (or Empty), and may be specified such that it is never bigger than Maximum. Second, there is the property Maximum (VARIANT), which is preferably the same type as Minimum (or Empty), and is never smaller than Minimum. Third, there is an entity restriction (VARIANT) that puts a restriction on the available answers. It is typically a filter, a search object or an expression type. Lastly, there is an object origin (VARIANT), that acts as a starting point for finding objects that satisfy the prompt. It is, typically an attribute or a filter.

A simple prompt is a prompt whose answer corresponds to a simple datatype. Simple prompts are defined for the most common Variant types.

A Boolean prompt is a prompt whose answer has the type Boolean. It has no validation properties, since for the Boolean type eliminating a possible value is tantamount to specifying which value is returned. That is, there is no point is defining a prompt whose answer is 'True' or 'False', but for which False is not a valid answer—since this means that the user is not being given a choice at all.

Thus, to define a Boolean prompt one declares that the prompt is Boolean. The title and meaning of the prompt is defined, since these are the properties that distinguish between different Boolean prompts.

A Long prompt is a prompt whose answer has type Long. A prompt's designer can use the minimum and maximum properties to specify minimum and maximum values for a valid answer. These properties should either be set to empty (signifying no minimum/maximum) or to a long value. Minimum should be smaller than or equal to the answer property, which in turn must be smaller than or equal to maximum.

A string prompt is a prompt whose answer is a string value. The default is to accept any string as a valid response. Integer values are assigned to Minimum or Maximum to specify a valid range for the length of the string. There is no upper limit on the length of the string.

A Double prompt is a prompt whose answer has type Double. A prompt's designer can use the Minimum and Maximum properties to specify Minimum and Maximum values for a valid answer. These properties should either be set to Empty (signifying no minimum/maximum) or to a numeric value. Minimum should be smaller than or equal to Answer, which in turn should be smaller than or equal to Maximum.

A Date prompt is a prompt used to specify a date. This should be done using the VB Date type, but the final decision will depend on how it is determined to represent date values.

A complex prompt is a prompt that cannot be expressed as a single value, but nevertheless is a fundamental COM object in the COM API. Most uses of prompts in the COM API are complex prompts.

A DSS Object prompt is a prompt whose result takes the form of a set of DSS Objects drawn from the metadata. The Minimum and Maximum properties are used with integer values to specify an acceptable range for the number of objects in the answer. In particular a designer would set both of these properties to 1 to define a prompt for a single DSS Object.

Specifying how many objects are acceptable does not provide sufficient information to validate an object prompt. It should also be known which objects are acceptable. Rather than defining a new set of properties for the various ways of limiting an object choice, the existing concept of a search object is reused.

A search object is an object that is used to specify a search. It does this by containing a list of restrictions on objects (by type, by name, by description, by parent folder, by owner, by content, etc.). An object prompt uses a search object to validate its answer. Objects that would have been returned by the search are acceptable. A GUI might choose to execute the search, and then invite the user to choose from the results. A search object is passed to the prompt by setting its Restriction property.

A search object is a DSS Object in its own right, so it is saved separately into the metadata. A user can always embed the search object in the prompt object (or in the same container as the prompt object if the prompt object is itself embedded) if the user wishes to conceal the use of a separate object.

In order to use an object prompt it must be understood how to read and write an answer for the prompt. The VARIANT returned by all three value properties of an object prompt (Default, Answer, Previous) may either be empty (if no value has been specified) or may contain an object reference (i.e. an IDispatch pointer) to a folder object.

The folder object (which will act like a search folder) may contain whichever objects the user or designer selected. In particular this allows a client to distinguish between the absence of the value (Variant will be empty), and the assigned value "no objects selected" (Variant will be an empty folder).

A user can assign a value to the prompt. There are two basic ways to do this. One way is to assign something to the property as a whole. This is useful if the user has access to a single object that describes the selection. However, if the user wants to select multiple objects, then the user should use the AddCopy method of the folder returned by the property to add additional objects to the property. Of course the user can only amend the value if they obtained the prompt interface in a context which allows write access to it.

An elements prompt is a prompt whose answer takes the form of a set of elements. An elements prompt is very similar to an objects prompt in the sense that the answer takes the form of a collection. There are also similar issues—how to validate which elements may be put in the collection, how to read the contents of the collection, how to modify the collection.

As with the objects prompt, the Minimum and Maximum properties may be used to specify a range of acceptable sizes for an element collection. A user sets these properties to empty if the user doesn't care to set a restriction.

If the designer does nothing else then the prompt will accept any set of elements. Generally speaking, a designer preferably wants to limit the set of available elements in some way.

The simplest way to do this is to assign a value to the Origin property. This value is interpreted as describing the place from which the elements are drawn. Either an Attribute (meaning that the elements are drawn from the given attribute) or a Dimension (meaning that the elements are drawn from an attribute in the dimension) may be used. A dimension object contains all the browse path information needed to allow the user to chose elements from the dimension.

In addition to containing relationships between their attributes, dimensions also contain filtering information. So a designer could create a dimension that specifies that only a subset of its elements are presented to a user. The dimension object also has provision to store multiple filters, and even filter templates (user types in first three letters of element etc.) to allow sophisticated control of element browsing.

This functionality permits a designer to specify a prompt that consists of selecting elements from an attribute using a particular filter—the designer could do this by creating a dimension that contains just the chosen attribute. However, to prevent the designer from having to create singleton dimensions in this way a designer is permitted to set the Restriction property to a filter object when the Origin property is an attribute. This means that the prompt only contains elements from the attribute that satisfy the filter. Since a filter can be defined using an explicit list of elements, this allows a designer to specify exactly which elements are available for the prompt. However, using a dimension is the only way that a designer can modify the default browse forms collection in the attribute.

The configuration of a dimension in the origin property and an attribute in the restriction property may also be used. This means that only elements from the given attribute are acceptable, but the user should be asked to use the given dimension to select the elements. The user can browse through other attributes in the dimension to reach the requested attribute, but cannot select elements from these attributes.

Accessing one of the value properties (Default, Answer or Previous) for the prompt object always returns either empty (if the value property has not been assigned) or an element collection (containing whichever elements were selected). This is done even if the collection contains only zero or a single element. This enables a user to distinguish between an unassigned value and a value that has been assigned to the empty collection without requiring a user to handle too many cases when examining one of these values.

A user may desire to be able to assign a new value to an elements prompt. As with the objects prompt the user can do this either by assigning a complete value to the property, or by retrieving an element collection from the property and then using the normal collection methods to modify the collection. The complete assignment can be to empty (to unset the property), to nothing (to make the property into an empty collection to a single element to make the collection contain just this element) or to an existing collection of elements (the entire collection is copied into the prompt instance).

An expression prompt is a prompt whose answer takes the form of a COM API expression. Expressions may be used to define both filters and metrics. A prompt for an expression is also useful to define concepts like a metric qualification.

Using an expression prompt represents a situation in which the user is allowed to build any expression that they like. The only restrictions that may be imposed on the user are a simple depth requirement, and a restriction on the type of expression allowed. A standard expression editor could be used to prompt a user to answer an expression prompt.

For an expression prompt the Minimum and Maximum properties are used to record a range for the depth of a valid expression. These allow a designer to specify "how big" the expression is allowed to be. The depth of an expression is the number of IDSSOperator nodes encountered on the longest path from the root of the expression to a leaf. Thus an expression has depth zero if it consists of a single leaf node, depth 1 if it contains a single operator (as in an Abell metric qualification "metric<32"), depth 2 if it contains an operator nested within an operator (e.g. "metric<metric2+1") and so on. An empty expression may be said to have a depth of −1.

An expression prompt uses the restriction property to record which type of expression it represents. Assign this property with a value taken from ExpressionType enumeration. This enumeration, which remains to be defined, contains entries like DssExpressionFilter or DssExpressionMetricQualification and so on. Each parameter corresponds to a different type of expression that the parser is able to recognize and validate.

A value property (Default, Answer or Previous) either returns empty if the value is unset, or returns the IDSSExpression interface (if the prompt is assigned). As usual this allows the user to distinguish between the absence of a value, and the value which represents an empty expression.

Users assign an expression value to a property in the usual way. They would assign 'Empty' to it to unset the property, 'Nothing' to set it to the empty expression, and an existing expression to replace the entire expression. Generally a user will edit the expression directly, by reading an IDSSExpression interface from the value property, and then editing the expression object in the same manner as is used to construct metrics or any other expression based object.

A draft prompt is a type of prompt which presents itself to a client as a collection of other prompts. The prompts in a draft prompt are referred to as blank prompts or simply blanks. A blank prompt is usually one of the simple or complex prompts outlined above, but it can also itself be a draft prompt. A blank prompt does not carry enough context information to uniquely identify it to the user. When a user is answering blank prompts the user needs to know both which blank prompt he is answering, and which instance of the draft prompt question it comes from.

A draft prompt is more complex to use and understand than other types of prompts. Notwithstanding, there are at least two benefits of using draft prompts. First, draft prompts allow a designer to connect together several prompt objects into a single larger prompt. The user is prompted for all of these connected prompt objects as a single prompt. The user can answer the blank prompts as individual prompts, or answer the draft prompt as a single operation, in which case all the blank prompts are also answered. Second, draft prompts permit a designer to present prompts to the user with more context information than just the collection of prompt locations.

The collection of blank prompts in a draft prompt may be presented in two ways. One way is as an ordered collection of prompt questions. Another way is in the form of a (read-only) DSS Object, or fragment of a DSS Object, called the draft prompt's origin that contains the blank prompts. The answer of a draft prompt consists of the origin with the answers to all of the blank prompts filled in.

If there are two or more non-merged instances of a draft prompt, then there may be two identical instances of the blank prompts that it contains. The resolution object may distinguish between these instances solely by which draft prompt instance they are below—there is no where for the designer of the report to place a separate Title and Meaning property for these blanks, since they both were generated from the same prompt instance. This is not a problem however, since a client application presents them to the user as part of the draft prompt and not as separate prompt instances.

Draft prompts are just a class of prompt types. When defining a draft prompt the Origin property is used to define the prompt's draft. The draft prompt appears to be an instance of whatever type of object, or object fragment the draft prompt represents. The designer should populate this object in the usual way, using normal interfaces, and prompt instances.

When populating the Origin object, the design should use other prompts to indicate blanks in the draft. There is no point in designing a draft prompt whose Origin object does not contain any other prompts, since this would mean that there is nothing left for the user to fill in. The blank prompts may appear in the draft prompt's instance collection.

When the resolution object populates its answer property, it may copy over the fixed structure from the origin property. For example, if the origin property contains an expression node, then the same node will be duplicated in the answer property. When the origin contains a prompt instance, the answer may instead contain a prompt question. The Prompts collection of the draft prompt's question acts as a shortcut to all of these prompt questions. These questions are the blank prompts that define the draft prompt.

Both the Merge property and the import/export mechanism can be used to specify that a blank prompt is the same as an ordinary prompt that is available directly from the resolution collection. If this happens the resolution object may only make one prompt question, but the question can be accessed either directly from the resolution object, or from the prompt question that represents the draft prompt.

However if a blank prompt has the merge property set to 'False', and no other prompt is imported to replace it, then it will not appear directly in the resolution collection. This is the behavior that sets the draft prompt apart from other types of prompt. The resolution object will create special prompt question for the blank prompt, which is only accessible from the draft prompt's question.

The user can close the draft prompt by closing each blank prompt in the draft prompt. The user either walks through the structures in the answer property, or goes to the prompts collection to obtain a list of blank prompts. Once the user has a blank prompt the user can close it using any one of the normal techniques. The answer to each blank prompt must satisfy the validation restrictions of that blank prompt.

A draft prompt is preferably closed when the blank prompts in the draft prompt are closed. Normally a user answers a draft prompt by separately closing all of the blank prompts in the draft prompt. As soon as the user closes the last blank prompt, the closed property of the draft prompt will set to 'True.'

However, a user can also close a draft prompt using a single operation. When the user does this, the resolution object will automatically close all of the blank prompts. FIG. 12 describes how the resolution object does this. If the user cancels the draft prompt, as in 1202, blank prompts associated with that draft prompt are canceled as shown in 1204. However, if the draft prompt cannot be cancelled, an error is returned in 1206. If the user sets the draft prompt to default as in 1208, each blank prompt which is open is closed and set to its default value in 1210. If the blank prompt has no default value, it is canceled. If it cannot be canceled in this situation, an error it returned at 1212. If the user sets the draft prompt to preview as in 1214, each open blank prompt is closed and set to its previous value (1216). If the draft prompt has no previous value, then this user action in declined. However, if the blank prompt's reuse property prohibits the blank prompt from being declined, an error is returned at 1218. If the user declines to answer the draft prompt, as in 1220, the system determines an action for the draft prompt at 1222. The actions could be as previously described, i.e. previous, default, cancel or break. An error will occur at 1224 if the draft prompt's Reuse property states it cannot be declined, or if one of the blank prompts cannot be answered in the prescribed manner.

It is possible for a blank prompt to be incomplete if it requires some other prompt to be closed in order to define the validation restrictions of the blank prompt. However, it is not possible for a draft prompt to be incomplete, if it doesn't have any validation restrictions of its own.

A draft prompt does not have a default value, or a previous value of its own. Instead it uses the values for each of its blank prompts. This means that both the Default and Previous properties of a draft prompt are set to 'Empty' on prompt objects and prompt instances. On a prompt question they should return structures showing what would happen if the user were to select the Default or Previous value. In particular, the cases "P.Answer=P.Default", "P.Answer=P.Previous" and "P.Answer=Empty" should be distinguishable.

Figure 13:
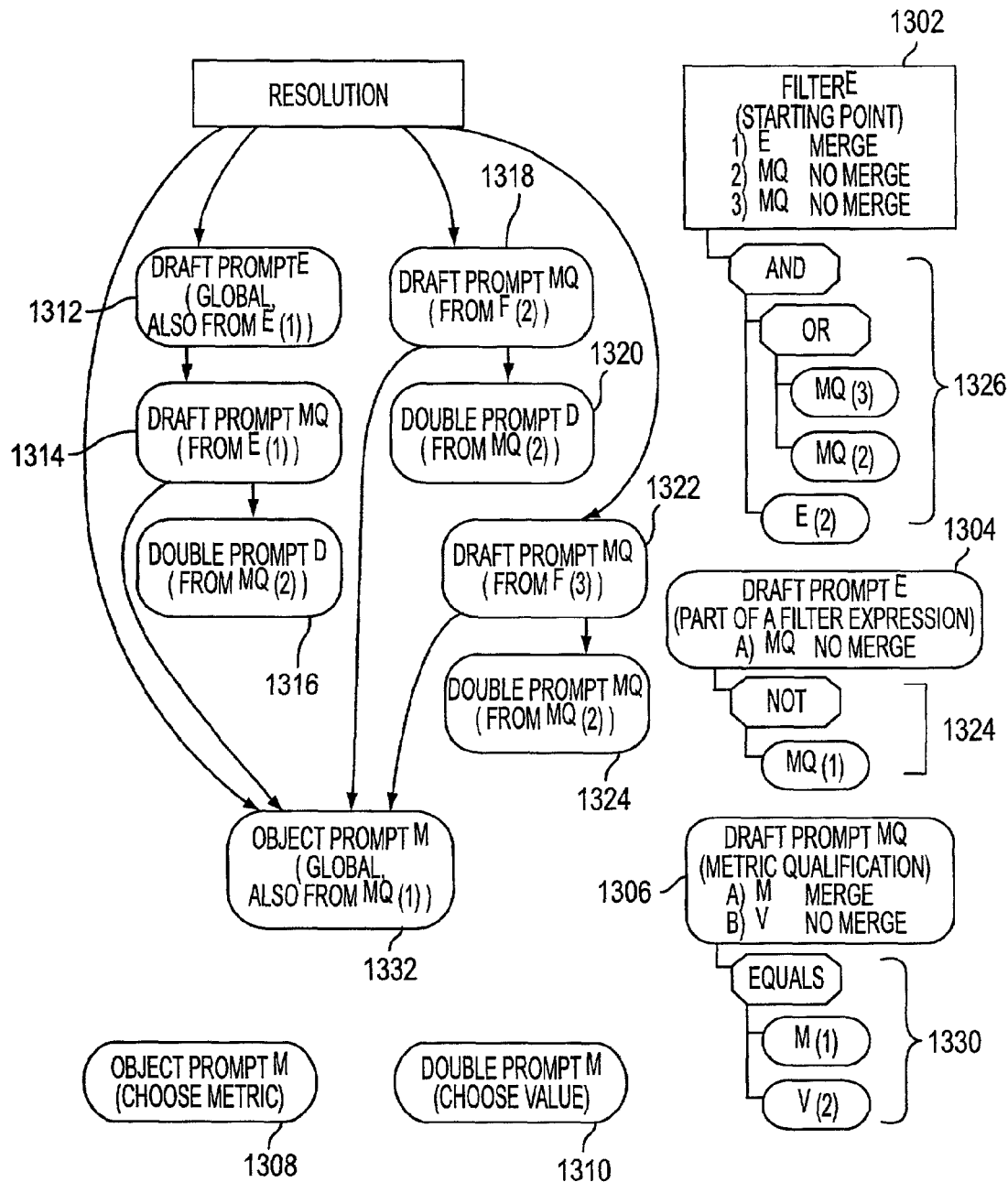
FIG. 13 depicts a diagram illustrating draft prompt resolution according to an embodiment of the present invention.

FIG. 13 illustrates an example of what happens when draft prompts are resolved. It shows the definitions of five objects—a filter 1302 called F, and four prompt objects, which consist of two draft prompts, 1304 and 1306, also called E and MQ, a metric prompt 1308 called M and a double prompt 1308 called V. Filter object 1302, and prompt objects 1304 and 1306, each shows its definition and prompt instances 1326, 1328 and 1330 respectively.

The resolution object is shown that would be generated if the filter were resolved. Each oval 1312, 1314, 1316, 1318, 1320, 1322, 1324 and 1330 below the resolution object represents one of the eight prompts that will be given to the user in order to answer all the prompts in the filter.

A normal prompt like M (1332) and D (1316, 1320, 1324) may preferably not contain any other prompts, but the draft prompts may contain other prompts. It is possible for one draft prompt to be nested inside another draft prompt. In FIG. 13, the instance of the E 1312 prompt contains an instance of MQ, which in turn contains an instance of M 1332 and an instance of D 1316. To simplify the diagram the expression trees have not been drawn in the resolution object, but in fact each draft prompt exposes its children via an expression tree as well as via a collection.

Normally a prompt question's primary location is sufficient to identify to which prompt question being referenced. For example, MQ is asked three times (1314, 1318 and 1322), once for each usage of MQ in the definitions. However when a prompt is below a draft prompt the primary location may not suffice. In this example, the D prompt is asked three times (1316, 1312, 1324), each time with the same primary location. The only way to distinguish between each occurrence is to see which draft prompt contains it. Since the M 1332 prompt's Merge property is 'True', this prompt is only asked once. The prompt question can be accessed directly from the main collection in the resolution object, and also from each instance of MQ.

An expression draft prompt is a draft prompt whose answer is an expression. It can be used to prompt for an entire expression, or to prompt for a sub-expression of a larger expression. It differs from the usual expression prompt because the designer of an expression draft prompt must provide an Origin expression. This expression contains prompts to indicate blanks that we want the user to fill in when the draft prompt is executed.

The expression draft prompt should be used to define something like a simple metric qualification prompt. The designer of the prompt can specify the format of the expression. The GUI can then recognize whether or not it is appropriate to use a special metric qualification dialog to ask the user to answer the prompt. The GUI should attach a special DSSProperty to a prompt to indicate whether or not it meets the requirements of such a dialog.

Origin may be the only validation property used for an expression draft prompt. As explained above, this property is used to define the draft of a valid answer. A designer inserts prompts in the Origin to indicate blanks in the draft. During report execution the user may be required to supply an answer for each blank prompt. Unless Merge is set to 'True' for a blank prompt, or the import/export mechanism is used, the blank prompt is preferably required to be answered once for each question that appears in the resolution object based on the draft prompt.

An example is provided here. A metric qualification prompt is defined. This prompt is based on three other prompts: "SelectBaseMetric", "ChooseOp" and "ChoosePositive."

SelectBaseMetric prompts the user to select a metric from a folder of metrics. We want to do this once during report execution, and use the same metric in the template, and in the metric qualification. ChooseOp selects a single operator object. ChoosePositive selects a floating-point number, that must be larger than zero. These prompts are desired to be treated simply as 'blanks' in the definition of the metric qualification. If the metric qualification appears twice then they should be asked twice.

The three value properties (Default, Answer and Previous) of a question node based on an expression draft all return either 'Empty' or an IDSSExpression object. In the first case it indicates that the value is not set. In the second case the interface is the root of the expression. The expression can be examined in exactly the same way as it is examined for an expression prompt. The expression cannot be edited—its purpose is to show the user the relationship between the blank nodes in the expression.

If a user wants to answer an expression draft prompt, the user should answer the single question based on the SelectBaseMetric prompt. The resolution object preferably makes one question, and return it from multiple places.

The user also should close the ChooseOp and ChoosePositive questions. These questions may preferably be found under questions based on the draft prompt. The user can either extract them from the Answer property of the draft prompt or use the Prompts collection on the draft prompt. If the draft prompt appears several times in the resolution object, then the blank questions should be answered separately for each appearance of the draft prompt.

FIG. 14 is an embodiment of the available prompt types according to the present invention, and the acceptable data types for each type of prompt for the various validation properties.

As disclosed above, it is possible to place a prompt object within another prompt object. Details of how export and import worked when one prompt was used inside another prompt have been provided. Now, further details on how one prompt can make use of another prompt are provided.

There is nothing particularly special about using one prompt inside another prompt. The procedure is the same as when a prompt is used in any other application object. The object that wants to use the prompt exposes a property (called Prompt if it only takes one prompt like IDSSConstant, or called something like XXXXPrompt if it is the prompt for the property XXXX). The object that wants to use the prompt assigns the prompt to the prompt-valued property.

The prompt-valued properties of a prompt are defined at the prompt object level. The import/export mechanism can be used to modify how the prompts inside a prompt are resolved.

When a prompt appears inside another prompt, it forces the inner prompt to be answered before the outer prompt. The value of the inner prompt is then used to validate the outer prompt when it is answered. Two prompts, however, should preferably not be mutually embedded in each other. Prompts defined in this way fail validation. If a user executes a report containing mutually recursive prompts, then report execution may cause failure.

It is also possible for one prompt to use another one indirectly. This happens if a DSS object assigned to one of the prompt's properties contains prompts itself. For example, a user could place a prompt in the filter assigned to the Restriction property of an elements prompt. The prompts are evaluated in order; otherwise the correct list of elements cannot be generated for the user to use to select the outer prompt.

The mechanism of incomplete prompts described above is used to enforce this dependency of one prompt on another. It allows the resolution object to refuse to close the outer prompt until the inner prompt has been closed.

There are four prompt-valued properties in a prompt object, which correspond to the four validation properties of a prompt. These allow a user to define a prompt whose value depends on another prompt that has to be answered first. A user is not allowed to supply a prompt for the answer value of a prompt—since numerous mechanisms have already been defined by which a user can specify that two prompts have the same answer. The prompt-valued properties include MinimumPrompt, MaximumPrompt, RestrictionPrompt, and OriginPrompt. With these, a prompt could be defined as that it's validation depends on another prompt.

For example, a designer may want to make a prompt that asks the user to select a single Store from the Stores in a filter chosen by another prompt. The only way to do this is to make the new prompt dependent on the old one. This illustrates why the locking mechanism is essential—there is no way to determine if an element is valid until the user has chosen the filter.

A designer can achieve much more complex relationships between prompts by permitting one prompt to indirectly refer to another prompt. The concepts however are the same.

Figure 15:
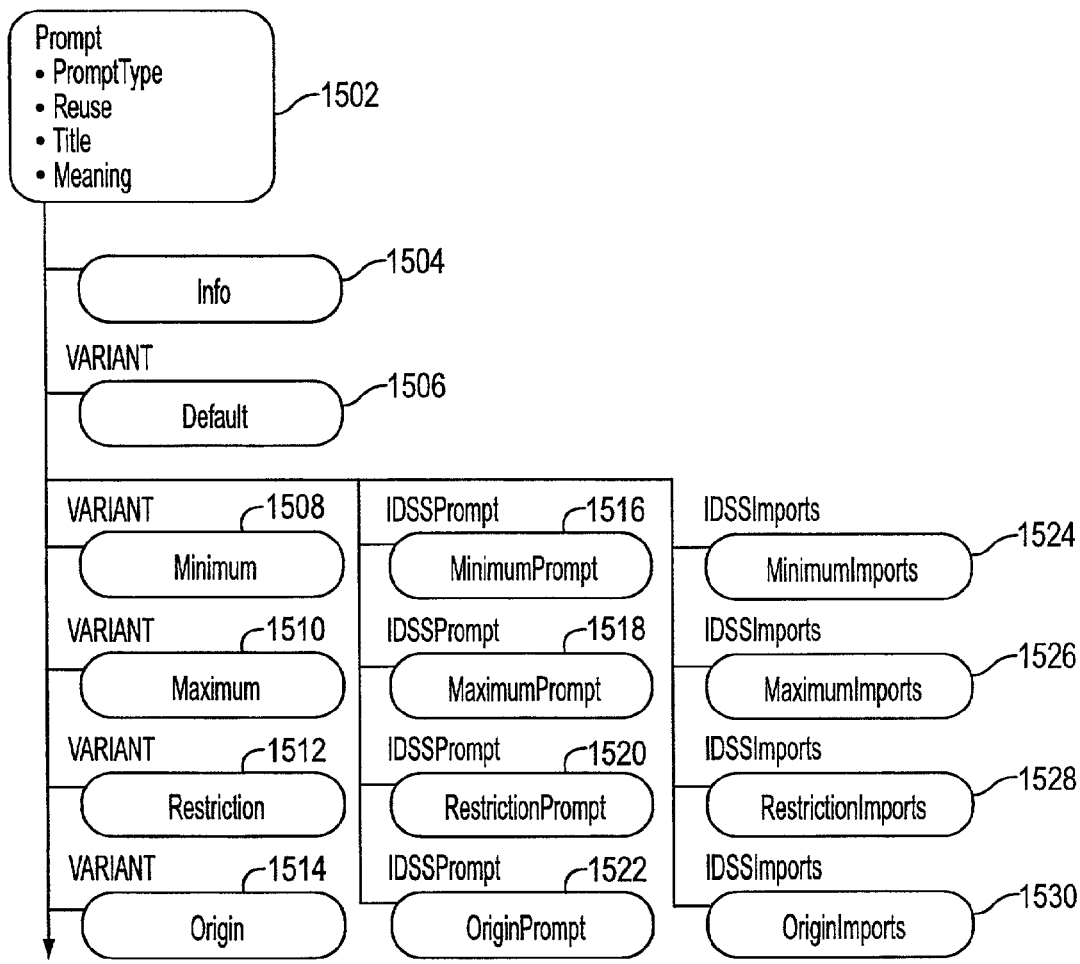
FIGS. 15-17 illustrate objects used to manipulate prompts under different uses of the prompts according to an embodiment of the present invention.
Figure 16:
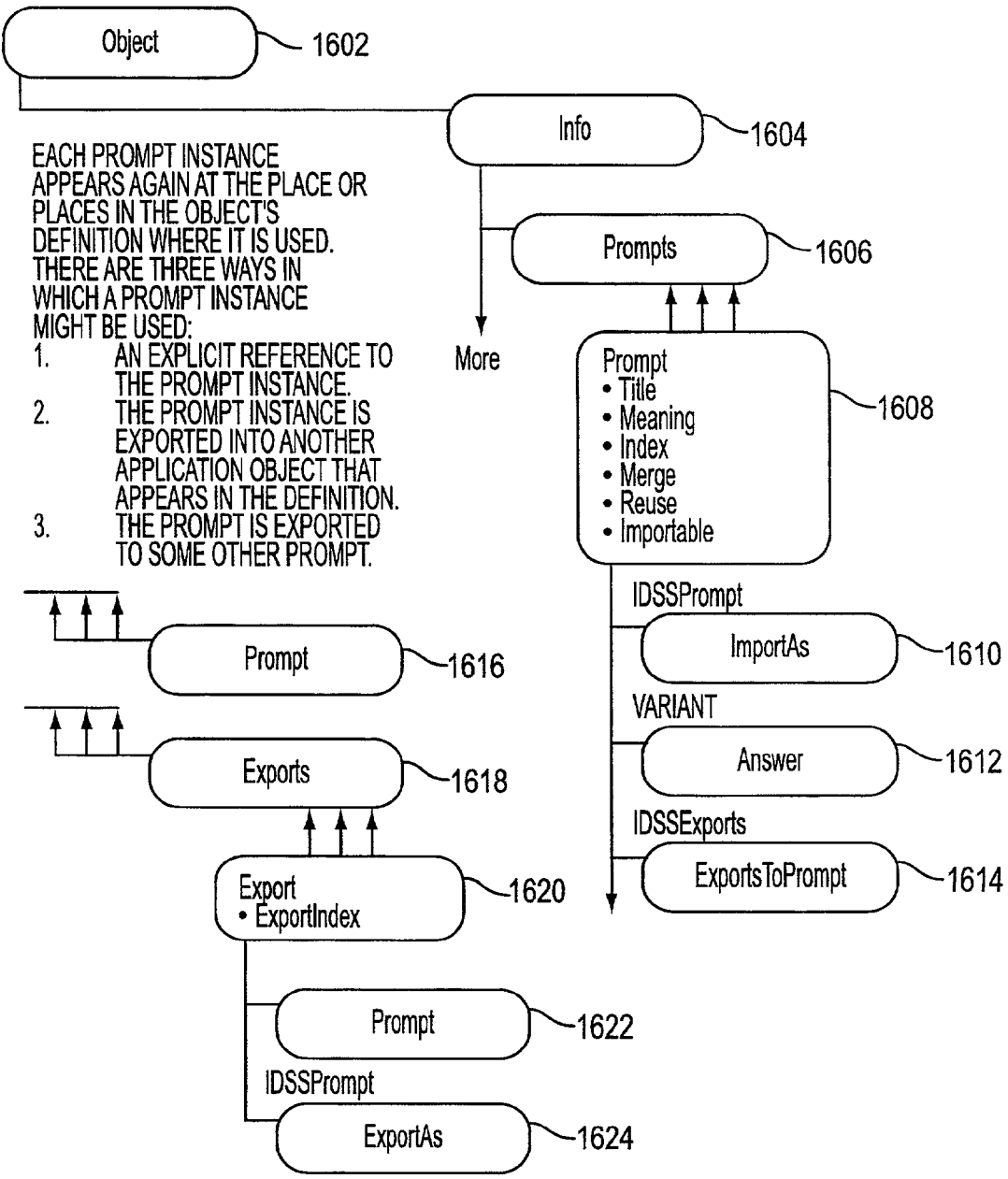
Figure 17:
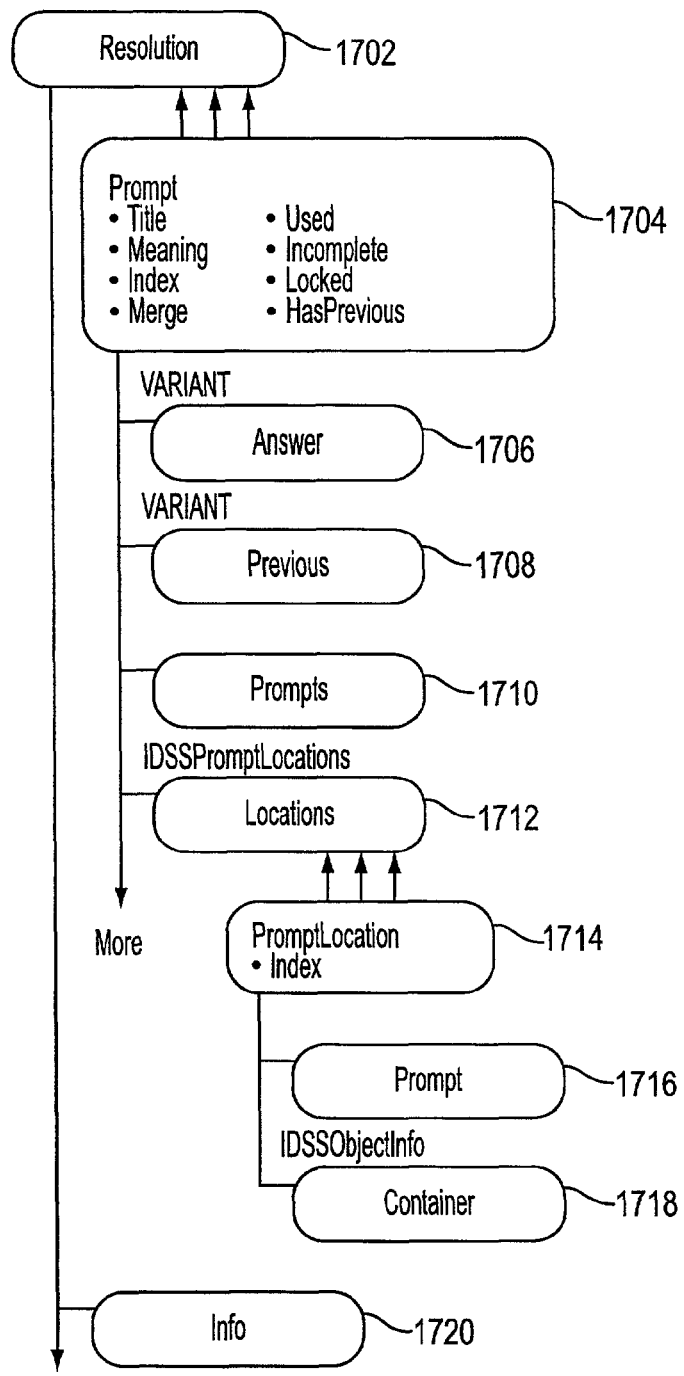

FIGS. 15, 16, and 17 show the relationships between the COM API objects used to manipulate prompts. Three different object maps are shown in FIGS. 15, 16 and 17 for the three different ways in which prompts are used. In each case only the properties are shown that are relevant to the particular case.

FIG. 15 shows the properties on the prompt interface that are used when defining prompt objects. Information on the prompt is maintained at 1504, and its default kept at 1506. The prompt's Minimum and Maximum Restriction and Origin are at 1508, 1510, 1512 and 1514 respectively. Similarly, Minimum Prompt, Maximum Prompt, Restriction Prompt and Origin Prompt are kept at 1516, 1518, 1520 and 1522, and Minimum Imports, Maximum Imports, Restriction Imports and Original Imports are at 1524, 1526, 1528 and 1530. The prompt interface also has other properties, but they are not used to define prompt objects.

FIG. 16 shows the ways in which a prompt instance can be used on an object 1602. FIG. 16 only shows those properties on the prompt interface that can be assigned when the prompt is used as a prompt instance. There are three ways in which a prompt instance may be used. There could be an explicit reference to the prompt instance as illustrated by 1616. The prompt instance could be exported to another application object that appears in the definition as shown in 1618, 1620, 1622, or 1624. Or, the prompt could be exported to some other prompt as shown in 1604, 1606, 1608, 1610, 1612, and 1614.

FIG. 17 shows the properties of the IDSSPrompt interface at 1704-1720 that are used when it is accessed from the resolution interface. In this case there are properties to show the current and former value of the prompt. There is also a collection of locations 1712 where the prompt was used.

Other embodiments and uses of the invention will be apparent to those skilled in the art from consideration of the specification and practice of the invention disclosed herein. The specification and examples should be considered exemplary only.

What is claimed is:

1. A prompt object on a computer-readable medium used in creating a report to be executed in a reporting system, wherein the report may specify a prompt object as a property of the report, the prompt object comprising:
   a question to be asked of a user;
   a prompt type; and
   at least one validation property;
   wherein the prompt object is used in creating a report to be executed in a reporting system, wherein the report may specify a prompt object as a property of the report, and wherein the prompt object is an object separate from the report such that the prompt object may be used more than once in a single report or may be used in more than one report.

2. The prompt object of claim 1 wherein at least one validation property comprises verification that the answer provided to the question is of the specified prompt type.

3. The prompt object of claim 1 further comprising a default answer to the question.

4. The prompt object of claim 1 further comprising a meaning that, upon request by a responder to the prompt, provides an explanation of the question.

5. The prompt object of claim 1 further comprising a reuse value that indicates whether an answer provided from a previous instance of that prompt object, a default value or a new value is to be used for an answer to the question in the prompt object.

6. A computer-implemented method of creating a report to be executed on a reporting system the method comprising the steps of:
   selecting a template with one or more template properties;
   selecting a filter with one or more filter properties; and
   specifying one or more of the template or filter properties with a prompt object;
   wherein the prompt object comprises:
      a question to be asked of a user;
      a prompt type; and
      at least one validation property, wherein the prompt object is an object separate from the report and separate from the one or more templates or filters such that the prompt object may be used more than once in a single report or may be used in more than one report.

7. The method of claim 6 wherein at least one validation property comprises verification that the answer provided to the question is of the specified prompt type.

8. The method of claim 6 wherein the prompt object further comprises a default answer to the question.

9. The method of claim 6 wherein the prompt object further comprises a meaning that, upon request by a responder to the prompt, provides an explanation of the question.

10. The method of claim 6 wherein the prompt object further comprises a reuse value that indicates whether an answer provided from a previous instance of that prompt object, a default value or a new value is to be used for an answer to the question in the prompt object.

11. The method of claim 6 further comprising the step of specifying a single prompt object for a plurality of properties in the report and wherein upon report execution, the question receives only one answer that is provided to a each property properties for which the prompt object was specified.

12. The method of claim 6 further comprising specifying at most one prompt object for a template or filter property.

13. The method of claim 6 wherein the template comprises a set of templates properties and the filter comprises a set of filter properties and wherein every template and filter property may be specified as a prompt object.

14. A processor-readable medium comprising code for execution by a processor to create a report to be executed on a reporting system, the medium comprising:
   code for causing a processor to enable a user to select a template with one or more template properties;

code for causing a processor to enable a user to select a filter with one or more filter properties; and code for causing a processor to enable a user to specify one or more of the template or filter properties with a prompt object;

wherein the prompt object comprises:

a question to be asked of a user;

a prompt type; and at least one validation property, wherein the prompt object is an object separate from the report such that the prompt object may be used more than once in a single report or may be used in more than one report.

15. The medium of claim 14 wherein at least one validation property comprises verification that the answer provided to the question is of the specified prompt type.

16. The medium of claim 14 wherein the prompt object further comprises a default answer to the question.

17. The medium of claim 14 wherein the prompt object further comprises a meaning that, upon request by a responder to the prompt, provides an explanation of the question.

18. The medium of claim 14 wherein the prompt object further comprises a reuse value that indicates whether an answer provided from a previous instance of that prompt object, a default value or a new value is to be used for an answer to the question in the prompt object.

19. The medium of claim 14 further comprising code for enabling a user to specify a single prompt object for a plurality of properties in a report definition object and wherein upon report execution, the question receives only one answer that is provided to a each property properties for which the prompt object was specified.

20. The medium of claim 14 wherein the template comprises a set of templates properties and the filter comprises a set of filter properties and further comprising code for causing a processor to enable a user to specify a prompt object fear each template and filter property selected.

21. A system for a report to be executed on a reporting system comprising of:

report selection means embodied on a computer-readable medium that enables a report creator to define one or more of a template, filter, or properties thereof with a prompt object;

wherein the prompt object comprises:

a question to be asked of a user;

a prompt type; and at least one validation property, wherein the prompt object is an object separate from the report such that the prompt object may be used more than once in a single report or may be used in more than one report.

22. The system of claim 21 wherein at least one validation property comprises verification that the answer provided to the question is of the specified prompt type.

23. The system of claim 21 wherein the prompt object further comprises a default answer to the question.

24. The system of claim 21 wherein the prompt object further comprises a meaning that, upon request by a responder to the prompt, provides an explanation of the question.

25. The system of claim 21 wherein the prompt object further comprises a reuse value that indicates whether an answer provided from a previous instance of that prompt object, a default value or a new value is to be used for an answer to the question in the prompt object.

26. The system of claim 21 wherein the report selection means enables a report creator to specify a single prompt object for a plurality of properties in the report and wherein upon report execution, the question receives only one answer that is provided to a each property properties for which the prompt object was specified.

27. The system of claim 21 wherein the report selection means enables a report creator to specify at most one prompt object for a template or filter property.

28. The system of claim 21 wherein the template comprises a set of templates properties and the filter comprises a set of filter properties and wherein every template and filter property may be specified as a prompt object.

* * * * *